United States Patent
Xue et al.

(10) Patent No.: US 9,750,004 B2
(45) Date of Patent: Aug. 29, 2017

(54) METHOD FOR TRANSMITTING AND RECEIVING DOWNLINK CONTROL INFORMATION, SERVING NODE AND USER EQUIPMENT

(71) Applicant: Huawei Technologies Co., Ltd., Shenzhen (CN)

(72) Inventors: Lixia Xue, Shenzhen (CN); Zhiyu Yan, Shenzhen (CN); Sha Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 153 days.

(21) Appl. No.: 14/604,217

(22) Filed: Jan. 23, 2015

(65) Prior Publication Data
US 2015/0131599 A1     May 14, 2015

Related U.S. Application Data

(63) Continuation of application No. PCT/CN2012/079097, filed on Jul. 24, 2012.

(51) Int. Cl.
*H04W 72/04* (2009.01)
*H04W 72/12* (2009.01)
*H04L 5/00* (2006.01)

(52) U.S. Cl.
CPC ......... *H04W 72/042* (2013.01); *H04L 5/0053* (2013.01); *H04L 5/0073* (2013.01); *H04W 72/1226* (2013.01); *H04W 72/1289* (2013.01)

(58) Field of Classification Search
None
See application file for complete search history.

(56) References Cited

U.S. PATENT DOCUMENTS 9,106,368 B2 * 8/2015 Suzuki ............... H04L 5/0007
9,204,411 B2 * 12/2015 Chen ................. H04W 56/0045
(Continued)

FOREIGN PATENT DOCUMENTS

| CN | 102104965 A | 6/2011 |
| CN | 102169583 A | 8/2011 |

(Continued)

OTHER PUBLICATIONS

"On the Necessity of Common Search Space on E-PDCCH," 3GPP TSG RAN WG1 Meeting #68bis, Jeju, Korea, R1-121454, pp. 1-4, 3$^{rd}$ Generation Partnership Project, Valbonne, France (Mar. 26-30, 2012).

(Continued)

*Primary Examiner* — Hong Cho
(74) *Attorney, Agent, or Firm* — Leydig, Voit & Mayer, Ltd.

(57) ABSTRACT

The invention discloses a method for transmitting and receiving downlink control information, a serving node and a user equipment. The method comprises: determining, by a serving node of a interfered UE, a protected resource, wherein the protected resource is located in at least one of the followings: a physical resource corresponding to a USS in a PDCCH, a physical resource corresponding to an expanded CSS in the PDCCH, a physical resource corresponding to a USS in an E-PDCCH or a physical resource corresponding to a CSS of the E-PDCCH; transmitting, by the serving node, first downlink control information of an interfered cell on the protected resource, wherein the first downlink control information comprises scheduling information for scheduling a paging message and/or a SIB1 message of the interfered cell. The invention can reduce the interference to a system broadcast message, a paging message and the like in a heterogeneous network.

16 Claims, 5 Drawing Sheets

(56) References Cited

U.S. PATENT DOCUMENTS

| 9,295,043 B2* | 3/2016 | Papasakellariou .... H04L 5/0053 |
| 9,544,823 B2* | 1/2017 | He ........................ H04W 28/16 |
| 2011/0273996 A1 | 11/2011 | Kim et al. |
| 2012/0093112 A1* | 4/2012 | Qu .......................... H04L 5/001 370/329 |
| 2013/0107809 A1* | 5/2013 | Ko ....................... H04L 5/0053 370/328 |
| 2013/0114572 A1* | 5/2013 | Fong .................... H04L 1/0038 370/336 |
| 2014/0177556 A1 | 6/2014 | Pan et al. |

FOREIGN PATENT DOCUMENTS

| CN | 102202324 A | 9/2011 |
| WO | WO 2011032035 A2 | 3/2011 |

OTHER PUBLICATIONS

"Search Space Design for Downlink Control Channel," 3GPP TSG RAN WG1 Meeting #68, Dresden, Germany, R1-120752, pp. 1-6, $3^{rd}$ Generation Partnership Project, Valbonne, France (Feb. 6-10, 2012).

"DL Performance Results for eICIC," 3GPP TSG RAN WG1 Meeting #66, Athens, Greece, R1-112439, pp. 1-10, $3^{rd}$ Generation Partnership Project, Valbonne, France (Aug. 22-26, 2011).

"$3^{rd}$ Generation Partnership Project; Technical Specification Group Radio Access Network; Evolved Universal Terrestrial Radio Access (E-UTRA); Physical layer procedures (Release 8)," 3GPP TS 36.213, V8.4.0, pp. 1-63, $3^{rd}$ Generation Partnership Project, Valbonne, France (Sep. 2008).

* cited by examiner

METHOD FOR TRANSMITTING AND RECEIVING DOWNLINK CONTROL INFORMATION, SERVING NODE AND USER EQUIPMENT

CROSS-REFERENCE TO RELATED APPLICATIONS

This application is a continuation of International Patent Application No. PCT/CN2012/079097, filed on Jul. 24, 2012, which is hereby incorporated by reference in its entirety.

FIELD OF TECHNOLOGY

The present invention relates to wireless communication technologies, and in particular to a method for transmitting and receiving downlink control information, a serving node and a user equipment (User Equipment, UE).

BACKGROUND OF THE INVENTION

A heterogeneous network (Heterogeneous Network, Hetnet) refers to a network consisting of serving nodes with different powers, wherein the serving nodes comprise a macro evolved nodeB (Macro eNB), a pico eNB (Pico eNB), a home eNB (H-eNB), a relay (Relay) and the like. In the heterogeneous network, a high-power serving node will cause interference to a low-power serving node. For example, the transmission power of the macro eNB is generally 46 dBm, the transmission power of the pico eNB is generally 30 dBm, and a UE served by the pico eNB will experience interference from the macro eNB. Particularly, in a scenario of cell range expansion (Cell Range Expansion, CRE), CRE means that the pico eNB is still selected as a serving cell even if the power received by the UE from the pico eNB is lower than the power received from the macro eNB. Thus, the strength of an interfering signal from the macro eNB is even higher than that of a useful signal from the pico eNB. In order to ensure the system performance of the heterogeneous network, it needs to ensure that a UE of the interfered cell can correctly demodulate downlink control information (Down Control Information, DCI), therefore interference among the serving nodes with different powers needs to be lowered.

The problem of inter-cell interference can be solved by employing a solution of time division multiplexing (Time Division Multiplexing, TDM). In the TDM solution, an interfering cell uses different transmission power in different subframes. For example, the subframes are divided into normal subframes (Normal subframe) and almost blank subframes (Almost Blank subframe), wherein the transmission power of the normal subframe is higher, and the transmission power of the almost blank subframe is lower or 0. At this moment, an interfered cell may schedule a UE easily affected by the interfering cell in the almost blank subframe, so that the UE experiences less interference caused by the interfering cell on time resource, thereby solving the problem that the interfered cell experiences strong interference.

However, some DCI of the interfered cell, such as the DCI for scheduling a system broadcast message and a paging message, still experience strong interference.

SUMMARY OF THE INVENTION

In view of this, embodiments of the present invention provide a method for transmitting and receiving downlink control information, a serving node and a user equipment, so as to reduce strong interference to a system broadcast message and a paging message of an interfered cell.

In one aspect, provided is a method for transmitting downlink control information, comprising:

determining, by a serving node of an interfered cell, a first resource, wherein the first resource is located in at least one of the followings:

a physical resource comprised in a UE-specific search space (USS) of a physical downlink control channel (PDCCH), an extended physical resource obtained by extending a common search space (CSS) of the PDCCH, a physical resource comprised in a USS of an enhanced physical downlink control channel (E-PDCCH), and a physical resource comprised in a CSS of the E-PDCCH;

transmitting, by the serving node, first downlink control information of the interfered cell on the first resource, wherein the first downlink control information comprises scheduling information for scheduling a paging message and/or a system information block 1 (SIB1) transmitted by the serving node of the interfered cell, and the paging message and/or the SIB1 are/is transmitted by the serving node of the interfered cell on a physical downlink shared channel (PDSCH) of the interfered cell.

In one possible implementation, the method further comprises:

transmitting, by the serving node of the interfered cell, the first downlink control information on a second resource;

wherein the second resource is a resource used by a serving node of an interfering cell to transmit second downlink control information in the interfering cell, and the second downlink control information comprises scheduling information for scheduling a paging message and/or a SIB1 message transmitted by the serving node of the interfering cell on a physical downlink shared channel (PDSCH) of the interfering cell.

In another possible implementation, the number of a subframe of the physical downlink shared channel (PDSCH) corresponding to the first downlink control information transmitted on the first resource is the same as that of the subframe of the first resource, and the number of a subframe of the PDSCH corresponding to the first downlink control information transmitted on the second resource is the same as that of the subframe of the second resource.

In yet another possible implementation, the number of a subframe of the first resource is different from the number of a subframe of the second resource;

the number of a subframe of the physical downlink shared channel (PDSCH) corresponding to the first downlink control information transmitted on the first resource is the same as that of the subframe of the first resource, and the number of a subframe of the PDSCH corresponding to the first downlink control information transmitted on the second resource is the same as that of the subframe of the second resource; or, the number of a subframe of the physical downlink shared channel (PDSCH) corresponding to the first downlink control information transmitted on the first resource is the same as that of the subframe of the first resource, and the number of a subframe of the PDSCH corresponding to the first downlink control information transmitted on the second resource is the same as that of the subframe of the physical downlink shared channel (PDSCH) corresponding to the first downlink control information transmitted on the first resource; or, the number of a subframe of the physical downlink shared channel (PDSCH) corresponding to the first downlink control information transmitted on the second resource is the same as that of the subframe of the second resource, and the number of a subframe of the PDSCH corresponding to the first downlink control information transmitted on the first resource is the same as that of the subframe of the physical downlink shared channel (PDSCH) corresponding to the first downlink control information transmitted on the second resource.

In yet another possible implementation, when the number of a subframe of the first resource is different from the number of a subframe of the second resource, and the first downlink control information is used for scheduling the SIB1 transmitted by the serving node of the interfered cell on the physical downlink shared channel (PDSCH) of the interfered cell, data transmitted on the PDSCH corresponding to the first downlink control information comprises first indicating information, wherein the first indicating information is used for indicating that the data transmitted on the PDSCH corresponding to the first downlink control information comprises the SIB1; or, the subframe number of a subframe of the PDSCH corresponding to the first downlink control information is used for identifying that data transmitted on the PDSCH corresponding to the first downlink control information comprises the SIB1.

In yet another possible implementation, when the number of a subframe of the first resource is different from the number of a subframe of the second resource, and the first downlink control information is used for scheduling the SIB1 transmitted by the serving node of the interfered cell on the physical downlink shared channel (PDSCH) of the interfered cell, the method further comprises:

transmitting, by the serving node of the interfered cell, third downlink control information, wherein the third downlink control information comprises scheduling information for scheduling a system broadcast message except a master information block (MIB) and the SIB1, and the system broadcast message except the master information block (MIB) and the SIB1 is transmitted by the serving node of the interfered cell on the PDSCH of the interfered cell;

data transmitted on the PDSCH corresponding to the third downlink control information comprises second indicating information, wherein the second indicating information is used for indicating that data transmitted on the PDSCH corresponding to the third downlink control information comprises the system broadcast message except the master information block (MIB) and the SIB1; or, the subframe number of the PDSCH corresponding to the third downlink control information is used for identifying that data transmitted on the PDSCH corresponding to the third downlink control information comprises the system broadcast message except the master information block (MIB) and the SIB1.

In yet another possible implementation, the serving node of the interfered cell is a low-power serving node; and the serving node of the interfering cell is a high-power serving node.

In yet another possible implementation, the extended physical resource obtained by extending a CSS of the PDCCH comprises:

an extended CCE with a number greater than or equal to 16 belonging to the CSS, obtained by extending the CSS consisting of control channel elements (CCEs) with numbers from 0 to 15.

In another aspect, provided is a method for receiving downlink control information, comprising:

receiving, by a user equipment (UE) of an interfered cell, first downlink control information transmitted by a serving node of the interfered cell on a first resource, wherein the first resource is located in at least one of the followings: a physical resource comprised in a UE-specific search space (USS) of a physical downlink control channel (PDCCH), an extended physical resource obtained by extending a common search space (CSS) of the PDCCH, a physical resource comprised in a USS of an enhanced physical downlink control channel (E-PDCCH), and a physical resource comprised in a CSS of the E-PDCCH; the first downlink control information comprises scheduling information for scheduling a paging message and/or a system information block 1 (SIB1) transmitted by the serving node of the interfered cell;

obtaining, by the UE, data on a physical downlink shared channel (PDSCH) indicated by the first downlink control information according to the first downlink control information, wherein the data on the PDSCH comprises the paging message and/or the SIB1.

In one possible implementation, the method further comprises: receiving, by the UE, the first downlink control information transmitted by the serving node on a second resource, wherein the second resource is a resource used by a serving node of an interfering cell to transmit second downlink control information in the interfering cell, and the second downlink control information comprises scheduling information for scheduling a paging message and/or a SIB1 message transmitted by the serving node of the interfering cell on a physical downlink shared channel (PDSCH) of the interfering cell.

In another possible implementation, the number of a subframe of the first resource is the same as the number of a subframe of the second resource;

the number of a subframe of the physical downlink shared channel (PDSCH) corresponding to the first downlink control information transmitted on the first resource is the same as that of the subframe of the first resource, and the number of a subframe of the PDSCH corresponding to the first downlink control information transmitted on the second resource is the same as that of the subframe of the second resource.

In yet another possible implementation, the number of a subframe of the first resource is different from the number of a subframe of the second resource;

the number of a subframe of the physical downlink shared channel (PDSCH) corresponding to the first downlink control information transmitted on the first resource is the same as that of the subframe of the first resource, and the number of a subframe of the PDSCH corresponding to the first downlink control information transmitted on the second resource is the same as that of the subframe of the second resource; or, the number of a subframe of the physical downlink shared channel (PDSCH) corresponding to the first downlink control information transmitted on the first resource is the same as that of the subframe of the first resource, and the number of a subframe of the PDSCH corresponding to the first downlink control information transmitted on the second resource is the same as that of the subframe of the physical downlink shared channel (PDSCH) corresponding to the first downlink control information transmitted on the first resource; or, the number of a subframe of the physical downlink shared channel (PDSCH) corresponding to the first downlink control information transmitted on the second resource is the same as that of the subframe of the second resource, and the number of a subframe of the PDSCH corresponding to the first downlink control information transmitted on the first resource is the same as that of the subframe of the physical downlink shared channel (PDSCH) corresponding to the first downlink control information transmitted on the second resource.

In yet another possible implementation, when the number of a subframe of the first resource is different from the number of a subframe of the second resource, and the first downlink control information is used for scheduling the SIB1 transmitted by the serving node of the interfered cell on the physical downlink shared channel (PDSCH) of the interfered cell, the data on the PDSCH further comprises first indicating information, wherein the first indicating information is used for indicating that the data on the PDSCH comprises the SIB1; or, the subframe number of a subframe of the PDSCH is used for identifying that the data on the PDSCH corresponding to the first downlink control information comprises the SIB1.

In yet another possible implementation, when the number of a subframe of the first resource is different from the number of a subframe of the second resource, and the first downlink control information is used for scheduling the SIB1 transmitted by the serving node of the interfered cell on the physical downlink shared channel (PDSCH) of the interfered cell, the method further comprises:

receiving, by the UE, third downlink control information, wherein the third downlink control information comprises scheduling information for scheduling a system broadcast message except a master information block (MIB) and the SIB1, and the system broadcast message except the master information block (MIB) and the SIB1 is transmitted by the serving node of the interfered cell on the PDSCH of the interfered cell;

data transmitted on the PDSCH corresponding to the third downlink control information comprises second indicating information, wherein the second indicating information is used for indicating that the data transmitted on the PDSCH corresponding to the third downlink control information comprises the system broadcast message except the master information block (MIB) and the SIB1; or, the subframe number of the PDSCH corresponding to the third downlink control information is used for identifying that data transmitted on the PDSCH corresponding to the third downlink control information comprises the system broadcast message except the master information block (MIB) and the SIB1.

In yet another possible implementation, the serving node of the interfered cell is a low-power serving node; and the serving node of the interfering cell is a high-power serving node.

In yet another possible implementation, the extended physical resource obtained by extending a CSS of the PDCCH comprises:

an extended CCE with a number greater than or equal to 16 belonging to the CSS, obtained by extending the CSS consisting of control channel elements (CCEs) with numbers from 0 to 15.

In yet another aspect, provided is a serving node, comprising:

a determining module, configured to determine a first resource, wherein the first resource is located in at least one of the followings:

a physical resource comprised in a UE-specific search space (USS) of a physical downlink control channel (PD-CCH), an extended physical resource obtained by extending a common search space (CSS) of the PDCCH, a physical resource comprised in a USS of an enhanced physical downlink control channel (E-PDCCH), and a physical resource comprised in a CSS of the E-PDCCH;

a first transmitting module, configured to transmit first downlink control information of an interfered cell on the first resource according to information of the first resource determined by the determining module, wherein the first downlink control information comprises scheduling information for scheduling a paging message and/or a system information block 1 (SIB1) transmitted by the serving node of the interfered cell, and the paging message and/or the SIB1 are/is transmitted by the serving node of the interfered cell on a physical downlink shared channel (PDSCH) of the interfered cell.

In one possible implementation, the serving node further comprises: a second transmitting module, configured to transmit the first downlink control information on a second resource;

wherein the second resource is a resource used by a serving node of an interfering cell to transmit second downlink control information in the interfering cell, and the second downlink control information comprises scheduling information for scheduling a paging message and/or a SIB1 message transmitted by the serving node of the interfering cell on a physical downlink shared channel (PDSCH) of the interfering cell.

In another possible implementation, the number of a subframe of the first resource is the same as the number of a subframe of the second resource;

the number of a subframe of the physical downlink shared channel (PDSCH) corresponding to the first downlink control information transmitted on the first resource is the same as that of the subframe of the first resource, and the number of a subframe of the PDSCH corresponding to the first downlink control information transmitted on the second resource is the same as that of the subframe of the second resource.

In yet another possible implementation, the number of a subframe of the first resource is different from the number of a subframe of the second resource;

the number of a subframe of the physical downlink shared channel (PDSCH) corresponding to the first downlink control information transmitted on the first resource is the same as that of the subframe of the first resource, and the number of a subframe of the PDSCH corresponding to the first downlink control information transmitted on the second resource is the same as that of the subframe of the second resource; or, the number of a subframe of the physical downlink shared channel (PDSCH) corresponding to the first downlink control information transmitted on the first resource is the same as that of the subframe of the first resource, and the number of a subframe of the PDSCH corresponding to the first downlink control information transmitted on the second resource is the same as that of the subframe of the physical downlink shared channel (PDSCH) corresponding to the first downlink control information transmitted on the first resource; or, the number of a subframe of the physical downlink shared channel (PDSCH) corresponding to the first downlink control information transmitted on the second resource is the same as that of the subframe of the second resource, and the number of a subframe of the PDSCH corresponding to the first downlink control information transmitted on the first resource is the same as that of the subframe of the physical downlink shared channel (PDSCH) corresponding to the first downlink control information transmitted on the second resource.

In yet another possible implementation, when the number of a subframe of the first resource is different from the number of a subframe of the second resource, and the first downlink control information is used for scheduling the SIB1 transmitted by the serving node of the interfered cell on the physical downlink shared channel (PDSCH) of the interfered cell, data transmitted on the PDSCH corresponding to the first downlink control information transmitted by the first transmitting module comprises first indicating information, wherein the first indicating information is used for indicating that the data transmitted on the PDSCH corresponding to the first downlink control information comprises the SIB1; or, the subframe number of a subframe of the PDSCH corresponding to the first downlink control information transmitted by the first transmitting module is used for identifying that data transmitted on the PDSCH corresponding to the first downlink control information comprises the SIB1.

In yet another possible implementation, when the number of a subframe of the first resource is different from the number of a subframe of the second resource, and the first downlink control information is used for scheduling the SIB1 transmitted by the serving node of the interfered cell on the physical downlink shared channel (PDSCH) of the interfered cell, the node further comprises:

a third transmitting module, configured to transmit third downlink control information, wherein the third downlink control information comprises scheduling information for scheduling a system broadcast message except a master information block (MIB) and the SIB1, and the system broadcast message except the master information block (MIB) and the SIB1 is transmitted by the serving node of the interfered cell on the PDSCH of the interfered cell serving node;

data transmitted on the PDSCH corresponding to the third downlink control information comprises second indicating information, wherein the second indicating information is used for indicating that the data transmitted on the PDSCH corresponding to the third downlink control information comprises the system broadcast message except the master information block (MIB) and the SIB1; or, the subframe number of the PDSCH corresponding to the third downlink control information is used for identifying that data transmitted on the PDSCH corresponding to the third downlink control information comprises the system broadcast message except the master information block (MIB) and the SIB1.

In yet another aspect, provided is user equipment, comprising:

a first receiving module, configured to receive first downlink control information transmitted by a serving node of an interfered cell on a first resource, wherein the first resource is located in at least one of the followings: a physical resource comprised in a UE-specific search space (USS) of a physical downlink control channel (PDCCH), an extended physical resource obtained by extending a common search space (CSS) of the PDCCH, a physical resource comprised in a USS of an enhanced physical downlink control channel (E-PDCCH), and a physical resource comprised in a CSS of the E-PDCCH; the first downlink control information comprises scheduling information for scheduling a paging message and/or a system information block 1 (SIB1) transmitted by the serving node of the interfered cell;

a first obtaining module, configured to receive the first downlink control information transmitted by the first receiving module, and obtain data on a physical downlink shared channel (PDSCH) indicated by the first downlink control information according to the first downlink control information, wherein the data on the PDSCH comprises the paging message and/or the SIB1.

In one possible implementation, the user equipment further comprises: a second receiving module, configured to receive the first downlink control information transmitted on a second resource by the serving node, wherein the second resource is a resource used by a serving node of an interfering cell to transmit second downlink control information in the interfering cell, and the second downlink control information comprises scheduling information for scheduling a paging message and/or a SIB1 message transmitted by the serving node of the interfering cell on a physical downlink shared channel (PDSCH) of the interfering cell.

In another possible implementation, the number of a subframe of the first resource used by the first receiving module is the same as the number of a subframe of the second resource used by the second receiving module;

the number of a subframe of the physical downlink shared channel (PDSCH) corresponding to the first downlink control information transmitted on the first resource is the same as that of the subframe of the first resource, and the number of a subframe of the PDSCH corresponding to the first downlink control information transmitted on the second resource is the same as that of the subframe of the second resource.

In yet another possible implementation, the number of a subframe of the first resource is different from that of the subframe of the second resource;

the number of a subframe of the physical downlink shared channel (PDSCH) corresponding to the first downlink control information transmitted on the first resource is the same as that of the subframe of the first resource, and the number of a subframe of the PDSCH corresponding to the first downlink control information transmitted on the second resource is the same as that of the subframe of the second resource; or, the number of a subframe of the physical downlink shared channel (PDSCH) corresponding to the first downlink control information transmitted on the first resource is the same as that of the subframe of the first resource, and the number of a subframe of the PDSCH corresponding to the first downlink control information transmitted on the second resource is the same as that of the subframe of the physical downlink shared channel (PDSCH) corresponding to the first downlink control information transmitted on the first resource; or, the number of a subframe of the physical downlink shared channel (PDSCH) corresponding to the first downlink control information transmitted on the second resource is the same as that of the subframe of the second resource, and the number of a subframe of the PDSCH corresponding to the first downlink control information transmitted on the first resource is the same as that of the subframe of the physical downlink shared channel (PDSCH) corresponding to the first downlink control information transmitted on the second resource.

In yet another possible implementation, when the number of a subframe of the first resource is different from the number of a subframe of the second resource, and the first downlink control information is used for scheduling the SIB1 transmitted by the serving node of the interfered cell on the physical downlink shared channel (PDSCH) of the interfered cell, the data on the PDSCH obtained by the first obtaining module further comprises first indicating information, wherein the first indicating information is used for indicating that the data on the PDSCH comprises the SIB1; or, the subframe number of a subframe of the PDSCH obtained by the first obtaining module is used for identifying that the data on the PDSCH corresponding to the first downlink control information comprises the SIB1.

In yet another possible implementation, when the number of a subframe of the first resource is different from the number of a subframe of the second resource, and the first downlink control information is used for scheduling the SIB1 transmitted by the serving node of the interfered cell on the physical downlink shared channel (PDSCH) of the interfered cell, the equipment further comprises:

a third receiving module, configured to receive third downlink control information, wherein the third downlink control information comprises scheduling information for scheduling a system broadcast message except a master information block (MIB) and the SIB1, and the system broadcast message except the master information block (MIB) and the SIB1 is transmitted by the serving node of the interfered cell on the PDSCH of the interfered cell; data transmitted on the PDSCH corresponding to the third downlink control information comprises second indicating information, wherein the second indicating information is used for indicating that the data transmitted on the PDSCH corresponding to the third downlink control information comprises the system broadcast message except the master information block (MIB) and the SIB1; or, the subframe number of the PDSCH corresponding to the third downlink control information is used for identifying that data transmitted on the PDSCH corresponding to the third downlink control information comprises the system broadcast message except the master information block (MIB) and the SIB1.

In another aspect, provided is a serving node, comprising:

a processor, configured to determine a first resource, wherein the first resource is located in at least one of the followings:

a physical resource comprised in a UE-specific search space (USS) of a physical downlink control channel (PDCCH), an extended physical resource obtained by extending a common search space (CSS) of the PDCCH, a physical resource comprised in a USS of an enhanced physical downlink control channel (E-PDCCH), and a physical resource comprised in a CSS of the E-PDCCH;

a transmitter, configured to transmit first downlink control information of an interfered cell on the first resource, wherein the first downlink control information comprises scheduling information for scheduling a paging message and/or a system information block 1 (SIB1) transmitted by the serving node of the interfered cell, and the paging message and/or the SIB1 are/is transmitted by the serving node of the interfered cell on a physical downlink shared channel (PDSCH) of the interfered cell.

In one possible implementation, the transmitter is further configured to:

transmit the first downlink control information on a second resource; wherein the second resource is a resource used by a serving node of an interfering cell to transmit second downlink control information in the interfering cell, and the second downlink control information comprises scheduling information for scheduling a paging message and/or a SIB1 message transmitted by the serving node of the interfering cell on a physical downlink shared channel (PDSCH) of the interfering cell.

In another possible implementation, the number of a subframe of the first resource is the same as the number of a subframe of the second resource;

the number of a subframe of the physical downlink shared channel (PDSCH) corresponding to the first downlink control information transmitted on the first resource is the same as that of the subframe of the first resource, and the number of a subframe of the PDSCH corresponding to the first downlink control information transmitted on the second resource is the same as that of the subframe of the second resource.

In yet another possible implementation, the number of a subframe of the first resource is different from the number of a subframe of the second resource;

the number of a subframe of the physical downlink shared channel (PDSCH) corresponding to the first downlink control information transmitted on the first resource is the same as that of the subframe of the first resource, and the number of a subframe of the PDSCH corresponding to the first downlink control information transmitted on the second resource is the same as that of the subframe of the second resource; or, the number of a subframe of the physical downlink shared channel (PDSCH) corresponding to the first downlink control information transmitted on the first resource is the same as that of the subframe of the first resource, and the number of a subframe of the PDSCH corresponding to the first downlink control information transmitted on the second resource is the same as that of the subframe of the physical downlink shared channel (PDSCH) corresponding to the first downlink control information transmitted on the first resource; or, the number of a subframe of the physical downlink shared channel (PDSCH) corresponding to the first downlink control information transmitted on the second resource is the same as that of the subframe of the second resource, and the number of a subframe of the PDSCH corresponding to the first downlink control information transmitted on the first resource is the same as that of the subframe of the physical downlink shared channel (PDSCH) corresponding to the first downlink control information transmitted on the second resource.

In yet another possible implementation, when the number of a subframe of the first resource is different from the number of a subframe of the second resource, and the first downlink control information is used for scheduling the SIB1 transmitted by the serving node of the interfered cell on the physical downlink shared channel (PDSCH) of the interfered cell, data transmitted on the PDSCH corresponding to the first downlink control information transmitted by the transmitter comprises first indicating information, wherein the first indicating information is used for indicating that the data transmitted on the PDSCH corresponding to the first downlink control information comprises the SIB1; or, the subframe number of a subframe of the PDSCH corresponding to the first downlink control information transmitted by the transmitter is used for identifying that data transmitted on the PDSCH corresponding to the first downlink control information comprises the SIB1.

In yet another possible implementation, wherein when the number of a subframe of the first resource is different from the number of a subframe of the second resource, and the first downlink control information is used for scheduling the SIB1 transmitted by the serving node of the interfered cell on the physical downlink shared channel (PDSCH) of the interfered cell, the transmitter is further configured to:

transmit third downlink control information, wherein the third downlink control information comprises scheduling information for scheduling a system broadcast message except a master information block (MIB) and the SIB1, and the system broadcast message except the master information block (MIB) and the SIB1 is transmitted by the serving node of the interfered cell on the PDSCH of the interfered cell;

data transmitted on the PDSCH corresponding to the third downlink control information comprises second indicating information, wherein the second indicating information is used for indicating that the data transmitted on the PDSCH corresponding to the third downlink control information comprises the system broadcast message except the master information block (MIB) and the SIB1; or, the subframe number of the PDSCH corresponding to the third downlink control information is used for identifying that data transmitted on the PDSCH corresponding to the third downlink control information comprises the system broadcast message except the master information block (MIB) and the SIB1.

In another aspect, provided is user equipment, comprising:

a receiver, configured to receive first downlink control information transmitted by a serving node of an interfered cell on a first resource, wherein the first resource is located in at least one of the followings: a physical resource corresponding to a UE-specific search space (USS) of a physical downlink control channel (PDCCH), an extended physical resource obtained by extending a common search space (CSS) of the PDCCH, a physical resource comprised in a USS of an enhanced physical downlink control channel (E-PDCCH), and a physical resource comprised in a CSS of the E-PDCCH; the first downlink control information comprises scheduling information for scheduling a paging message and/or a system information block 1 (SIB1) transmitted by the serving node of the interfered cell;

a processor, configured to obtain data on a physical downlink shared channel (PDSCH) indicated by the first downlink control information according to the first downlink control information, wherein the data on the PDSCH comprises the paging message and/or the SIB1.

In one possible implementation, the receiver is further configured to:

receive the first downlink control information transmitted by the serving node on a second resource, wherein the second resource is a resource used by a serving node of an interfering cell to transmit second downlink control information in the interfering cell, and the second downlink control information comprises scheduling information for scheduling a paging message and/or a SIB1 message transmitted by the serving node of the interfering cell on a physical downlink shared channel (PDSCH) of the interfering cell.

In another possible implementation, the number of a subframe of the first resource is the same as the number of a subframe of the second resource;

the number of a subframe of the physical downlink shared channel (PDSCH) corresponding to the first downlink control information received on the first resource by the receiver is the same as that of the subframe of the first resource, and the number of a subframe of the PDSCH corresponding to the first downlink control information transmitted on the second resource is the same as that of the subframe of the second resource.

In yet another possible implementation, the number of a subframe of the first resource is different from the number of a subframe of the second resource;

the number of a subframe of the physical downlink shared channel (PDSCH) corresponding to the first downlink control information received on the first resource by the receiver is the same as that of the subframe of the first resource, and the number of a subframe of the PDSCH corresponding to the first downlink control information transmitted on the second resource is the same as that of the subframe of the second resource; or, the number of a subframe of the physical downlink shared channel (PDSCH) corresponding to the first downlink control information transmitted on the first resource is the same as that of the subframe of the first resource, and the number of a subframe of the PDSCH corresponding to the first downlink control information transmitted on the second resource is the same as that of the subframe of the physical downlink shared channel (PDSCH) corresponding to the first downlink control information transmitted on the first resource; or, the number of a subframe of the physical downlink shared channel (PDSCH) corresponding to the first downlink control information transmitted on the second resource is the same as that of the subframe of the second resource, and the number of the subframe of the PDSCH corresponding to the first downlink control information transmitted on the first resource is the same as that of the subframe of the physical downlink shared channel (PDSCH) corresponding to the first downlink control information transmitted on the second resource.

In yet another possible implementation, when the number of a subframe of the first resource is different from the number of a subframe of the second resource, and the first downlink control information is used for scheduling the SIB1 transmitted by the serving node of the interfered cell on the physical downlink shared channel (PDSCH) of the interfered cell, the data on the PDSCH, obtained by the processor, further comprises first indicating information, wherein the first indicating information is used for indicating that the data on the PDSCH comprises the SIB1; or, the subframe number of a subframe of the PDSCH, obtained by the processor, is used for identifying that the data on the PDSCH corresponding to the first downlink control information comprises the SIB1.

In another possible implementation, when the number of a subframe of the first resource is different from the number of a subframe of the second resource, and the first downlink control information is used for scheduling the SIB1 transmitted by the serving node of the interfered cell on the physical downlink shared channel (PDSCH) of the interfered cell serving node, the receiver is further configured to:

receive third downlink control information, wherein the third downlink control information comprises scheduling information for scheduling a system broadcast message except a master information block (MIB) and the SIB1, and the system broadcast message except the master information block (MIB) and the SIB1 is transmitted by the serving node of the interfered cell on the PDSCH of the interfered cell;

data transmitted on the PDSCH corresponding to the third downlink control information comprises second indicating information, wherein the second indicating information is used for indicating that the data transmitted on the PDSCH corresponding to the third downlink control information comprises the system broadcast message except the master information block (MIB) and the SIB1; or, the subframe number of the PDSCH corresponding to the third downlink control information is used for identifying that data transmitted on the PDSCH corresponding to the third downlink control information comprises the system broadcast message except the master information block (MIB) and the SIB1.

Through the above technical solutions, the serving node of the interfered UE transmits the SIB1 and/or the paging message of the interfered cell on the first resource. The first resource will be separated from the preset resource as much as possible, the interfering cell transmits the downlink control information using higher power on the preset resource, and the power on the non-preset resource can be lower, therefore strong interference to the SIB1 and the paging message of the interfered cell can be reduced.

BRIEF DESCRIPTION OF THE DRAWINGS

In order to illustrate the technical solutions in the embodiments of the present invention more clearly, a brief introduction will be given below to the drawings required in the embodiments of the present invention, and apparently, the drawings described below are some embodiments of the present invention only, and other drawings can be obtained by those skilled in the art based on these drawings without inventive efforts.

DETAILED DESCRIPTION OF THE EMBODIMENTS

Figure 1:
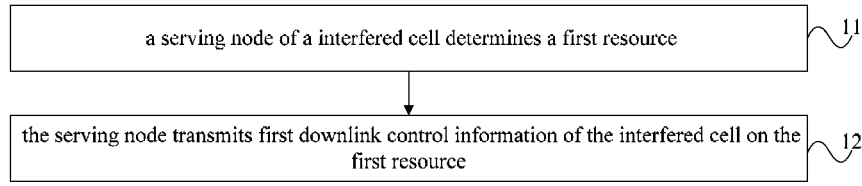
FIG. 1 is a flow diagram of an embodiment of a method for transmitting downlink control information of the present invention.

To make objectives, technical solutions and advantages of the embodiments of the present invention clearer, a clear and complete description of technical solutions of the embodiments of the present invention will be given below, in conjunction with the accompanying drawings in the embodiments of the present invention. Apparently, the embodiments described are only a part, but not all, of the embodiments of the present invention. All of other embodiments obtained by those skilled in the art without any inventive efforts, fall into the protection scope of the present invention.

An interfering cell is a cell of which a transmitted signal causes interference to other cells, and may be referred to as a victim cell.

An interfered cell is a cell experiencing interference from signals transmitted by other cells, and may be referred to as an aggressor cell.

The existing protocol stipulates that some messages such as a system broadcast message and a paging message are required to be transmitted in specified subframes.

The specified subframes, i.e., the subframes in which there is probably the system broadcast message or the paging message, may be referred to as predefined subframes.

Specifically, the system broadcast message is divided into a master information block (Master Information Block, MIB) and a system information block (System Information Block, SIB). The SIB is divided into a SIB1, a SIB2 and the like according to different repeated cycles and contained contents. For example, the scheduling cycle of the SIB1 is 80 ms, that is, the SIB1 is scheduled and transmitted at a position in which a system frame number (System Frame Number, SFN) is integer multiples of 8, namely, SFN %8=0, and transmitted repeatedly at a position in which SFN %2=0=. The existing protocol stipulates that the SIB1 is transmitted in a $5^{th}$ subframe of the radio frames (SFN %8=0 and SFN %2=0).

For the paging (Paging) message, a UE firstly monitors whether a paging radio network temporary identifier (Paging Radio Network Temporary Identifier, P-RNTI) is carried on a physical downlink control channel (Physical Downlink Control Channel, PDCCH) at a paging occasion in its corresponding paging radio frame, and then determines whether a paging message for the UE is carried on a corresponding physical downlink shared channel (Physical Downlink Shared Channel, PDSCH). According to a paging related algorithm, the subframes in which the paging occasion in a frequency division duplex (Frequency Division Duplex, FDD) system probably occurs are the $0^{th}$, $4^{th}$, $5^{th}$ and $9^{th}$ subframes of a frame, and the subframes in which the PO (Paging occasion, paging occasion) in a time division duplex (Time Division Duplex, TDD) system probably occurs are the $0^{th}$, $1^{st}$, $5^{th}$ and $6^{th}$ subframes of a frame.

For convenience of description in this application, the subframe in which there is probably the SIB1 message or the paging message is referred to as predefined subframes. For example, the predefined subframe comprises the $5^{th}$ subframe corresponding to the SIB1 or the $0^{th}$, $4^{th}$, $5^{th}$ and $9^{th}$ subframes or the $0^{th}$, $1^{st}$, $5^{th}$ and $6^{th}$ subframes corresponding to the paging message. The SIB1 and the paging message are transmitted in the predefined subframes, thus a UE in idle mode can monitor the PDCCHs of the SIB1 and paging in the predefined subframes, so that the advantage of saving power is achieved.

In the prior art, in order to solve the problems of backward compatibility and the like, the system broadcast messages and the paging messages of an interfering cell (such as a macro cell) and an interfered cell (such as a pico cell) in a heterogeneous network are transmitted in the predefined subframes. In order to solve the problem of interference at this moment, the present invention gives the following embodiments.

FIG. 1 is a flow diagram of an embodiment of a method for transmitting downlink control information of the present invention. The method comprises:

Step 11: a serving node of an interfered cell determines a first resource, wherein the first resource is located in at least one of the followings:

a physical resource comprised in a USS of a PDCCH, an extended physical resource obtained by extending a CSS of the PDCCH, a physical resource comprised in a USS of an E-PDCCH, and a physical resource comprised in a CSS of the E-PDCCH;

wherein the first resource may also be referred to as a protected resource. On the protected resource, it can be avoided that, scheduling information of an interfering cell and scheduling information of the interfered cell, which are used for scheduling a paging message and a SIB1 message, directly affect each other.

Step 12: the serving node transmits first downlink control information of the interfered cell on the first resource, wherein the first downlink control information comprises scheduling information for scheduling a paging message and/or a SIB1 transmitted by the serving node of the interfered cell, and the paging message and/or the SIB1 are/is transmitted by the serving node of the interfered cell on a PDSCH of the interfered cell.

The interfered cell is a cell of an interfered UE. In the embodiments of the present invention, for the interfered cell, a pico cell is taken as an example, and for the interfering cell, a macro cell is taken as an example. The SIB1 message is taken as an example for a message transmitted in a predefined subframe, which may be a reference for the paging message.

As mentioned above, a SIB1 message of the macro cell is transmitted in the predefined subframe, and in addition, scheduling information for scheduling the SIB1 message is transmitted on a physical resource corresponding to a common search space (Common Search Space, CSS) of a PDCCH in the predefined subframe. That is, the resource carrying the scheduling information for scheduling the SIB1 message and/or a paging message for the interfering cell is located in a physical resource corresponding to the CSS of the PDCCH in the predefined subframe.

In the embodiments of the present invention, in order to reduce the impact of interference, scheduling information for the SIB1 of the pico cell not only may be transmitted on the physical resource corresponding to the CSS of the PDCCH in the predefined subframe, but also may be transmitted on another resource.

That is, alternatively, the method further comprises: the serving node of the interfered cell transmits the first downlink control information on a second resource, wherein the second resource is a resource used by a serving node of an interfering cell to transmit second downlink control information in the interfering cell, and the second downlink control information comprises scheduling information for scheduling a paging message and/or a SIB1 message transmitted by the serving node of the interfering cell on a physical downlink shared channel (PDSCH) of the interfering cell.

The second resource may be located in the physical resource comprised in the CSS of the PDCCH in the predefined subframe.

As the serving node of the interfering cell transmits the second downlink control information on the second resource, the interference suffered when the serving node of the interfered node transmits the first downlink control information on the first resource is lower relative to that when the serving node of the interfered node transmits the first downlink control information on the second resource, so as to ensured that the first downlink control information can be correctly received by the UE as much as possible.

Alternatively, the scheduling information for the SIB1 of the pico cell may also not be transmitted on the physical resource corresponding to the CSS of the PDCCH in the predefined subframe, but merely on another resource.

Alternatively, the first resource may be located in a resource in a non-predefined subframe.

Furthermore, the resource in the non-predefined subframe may be a physical resource corresponding to a UE-specific search space (UE-Specific Search Space, USS) of a PDCCH in the non-predefined subframe, a physical resource corresponding to a CSS of the PDCCH in the non-predefined subframe, a physical resource corresponding to a USS of an enhanced PDCCH (Enhanced PDCCH, E-PDCCH) in the non-predefined subframe or a physical resource corresponding to a CSS of the E-PDCCH in the non-predefined subframe.

Alternatively, the first resource may also be located in a physical resource corresponding to a CSS of a non-PDCCH in the predefined subframe.

Furthermore, the physical resource corresponding to the CSS of the non-PDCCH may be: a physical resource corresponding to the USS of the PDCCH, an extended physical resource (the physical resource may be abbreviated as the physical resource corresponding to the extended CSS) obtained by extending the CSS of the PDCCH, a physical resource corresponding to the USS of the E-PDCCH or a physical resource corresponding to the CSS of the E-PDCCH.

Alternatively, the extended physical resource may be obtained by adopting the following mode: extending the CSS consisting of control channel elements (CCEs) with numbers from 0 to 15, thus obtaining an extended CCE with a number greater than or equal to 16 belonging to the CSS.

Which first resource is specifically used may be determined in a pre-configuration mode.

Figure 2:
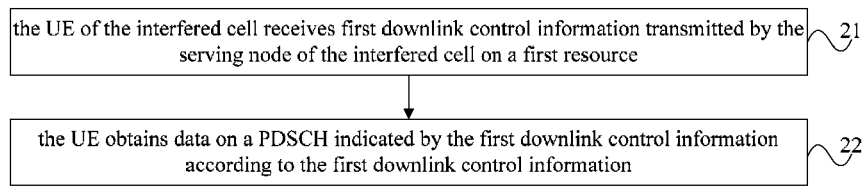
FIG. 2 is a flow diagram of an embodiment of a method for receiving downlink control information of the present invention.

Correspondingly, with reference to FIG. 2, the UE of the interfered cell performs the following procedures:

step 21: the UE of the interfered cell receives first downlink control information transmitted by the serving node of the interfered cell on a first resource, wherein the first resource is located in at least one of the followings: a physical resource comprises in a USS of a PDCCH, a extended physical resource obtained by extending a CSS of the PDCCH, a physical resource comprised in a USS of an E-PDCCH, and a physical resource comprised in a CSS of the E-PDCCH; the first downlink control information comprises scheduling information for scheduling a paging message and/or a SIB1 transmitted by the serving node of the interfered cell;

step 22: the UE obtains data on a PDSCH indicated by the first downlink control information according to the first downlink control information, wherein the data on the PDSCH comprises the paging message and/or the SIB1.

That is to say, if the scheduling information of the SIB1 of the pico cell is not only transmitted on the physical resource corresponding to the CSS of the PDCCH in the predefined subframe, but also transmitted on another resource, compared with the prior art, for some UE, the UE not only needs to detect the first downlink control information in the CSS of the PDCCH in the predefined subframe, but also needs to detect the first downlink control information on the first resource. Certainly, it should be understood that, the first downlink control information of the UE may still be transmitted on the physical resource corresponding to the CSS of the PDCCH in the predefined subframe, and if the UE can detect the first downlink control information on the physical resource corresponding to the CSS of the PDCCH in the predefined subframe, the UE may no longer detect the first downlink control information on the first resource; and if the UE does not detect the first downlink control information on the physical resource corresponding to the CSS of the PDCCH in the predefined subframe, the UE detect the first downlink control information on the first resource.

That is, alternatively, the method may further comprise: the UE receives the first downlink control information transmitted by the serving node on a second resource, wherein the second resource is a resource used by a serving node of an interfering cell to transmit second downlink control information in the interfering cell, and the second downlink control information comprises scheduling information for scheduling a paging message and/or a SIB1 message transmitted by the serving node of the interfering cell on a PDSCH of the interfering cell.

Or, if the scheduling information of the SIB1 of the pico cell is not transmitted on the physical resource (namely, the second resource) corresponding to the CSS of the PDCCH in the predefined subframe, but transmitted on another resource, compared with the prior art, the UE need not to detect the first downlink control information in the CSS of the PDCCH in the predefined subframe, but detects the first downlink control information on the first resource.

When the first downlink control information is detected, decoding may be firstly performed according to different DCI formats, and then descrambling and CRC checking are performed according to a corresponding RNTI (such as a SI-RNTI or a P-RNTI) to obtain correct first downlink control information. Then, data on a corresponding PDSCH, such as the SIB1 message or the paging message of the interfered cell, is obtained according to the indication of the first downlink control information.

Alternatively, the PDSCHs indicated by the first downlink control information on the physical resource corresponding to the CSS of the PDCCH in the predefined subframe and the first downlink control information on the first resource may be identical or different. Specifically, the followings may be comprised.

Alternatively, the number of a subframe of the first resource is the same as the number of a subframe of the second resource;

the number of s subframe of the physical downlink shared channel (PDSCH) corresponding to the first downlink control information transmitted on the first resource is the same as that of the subframe of the first resource, and the number of s subframe of the PDSCH corresponding to the first downlink control information transmitted on the second resource is the same as that of the subframe of the second resource. Or, the number of a subframe of the first resource is different from the number of a subframe of the second resource;

the number of a subframe of the physical downlink shared channel (PDSCH) corresponding to the first downlink control information transmitted on the first resource is the same as that of the subframe of the first resource, and the number of a subframe of the PDSCH corresponding to the first downlink control information transmitted on the second resource is the same as that of the subframe of the second resource; or, the number of a subframe of the physical downlink shared channel (PDSCH) corresponding to the first downlink control information transmitted on the first resource is the same as that of the subframe of the first resource, and the number of a subframe of the PDSCH corresponding to the first downlink control information transmitted on the second resource is the same as that of the subframe of the physical downlink shared channel (PDSCH) corresponding to the first downlink control information transmitted on the first resource; or, the number of a subframe of the physical downlink shared channel (PDSCH) corresponding to the first downlink control information transmitted on the second resource is the same as that of the subframe of the second resource, and the number of a subframe of the PDSCH corresponding to the first downlink control information transmitted on the first resource is the same as that of the subframe of the physical downlink shared channel (PDSCH) corresponding to the first downlink control information transmitted on the second resource. In this embodiment, as the scheduling information of the interfered cell is transmitted on the first resource, the interference caused by the interfering cell can be reduced as much as possible, and it is ensured that the UE of the interfered cell correctly demodulate the downlink control information.

When LTE downlink data is transmitted, a PDSCH carries data transmitted by a base station to a UE, a PDCCH carries scheduling information of the corresponding PDSCH, and the scheduling information is mainly used for indicating transmission format information of the corresponding PDSCH, comprising resource allocation, transport block size, modulation and coding scheme, rank for transmission, precoding matrix information and the like, wherein the PDCCH and the PDSCH are multiplexed in a subframe. In one subframe, all PDCCHs for scheduling user equipments are multiplexed together and then transmitted in a PDCCH area.

The mapping resources of the PDCCH may be divided into a CSS and a USS. Scheduling information of a message such as a system broadcast message, a paging message, a random access response message, a power control message and the like, may be transmitted on a physical resource corresponding to the CSS, and scheduling information for UE specific data may be transmitted on the physical resource corresponding to the USS. Each PDCCH contains 16-bit CRC which is used by a UE to verify whether a received PDCCH is correct. And the CRC is scrambled by a RNTI related to the UE, enabling the UE to determine which PDCCH needs to be received by the UE and which PDCCH is transmitted to another UE. Moreover, for one UE, there are different RNTIs for different types of services, such as a SI-RNTI, a C-RNTI, a P-RNTI, an RA-RNTI and an SPS-RNTI. The RNTIs are used for scrambling CRC of the information on the PDCCH. The CRCs of the paging message and the system broadcast message are scrambled by the P-RNTI and the SI-RNTI respectively. The UE knows these identifiers before receiving the messages.

The UE obtains the information carried on the PDCCH in a blind detection mode. The blind detection process is as follows: the UE generally does not know the format of transmitted information in DCI of the current PDCCH, and also does not know the position of the information required per se. However, the UE knows the information expected per se at present, for example, the information expected by the UE in an idle state is a paging, a SI; an RACH response is expected after random access is initiated; a UL Grant is expected when uplink data waits for transmission; and the like. For different expected information, the UE performs CRC checking on information in a CCE using a corresponding X-RNTI. If the CRC checking is successful, the UE knows that this information is required per se, and also knows a corresponding DCI format and modulation mode, and thus further decodes the contents of the DCI. This is the so-called "blind detection" process. In the blind detection process, the UE descrambles the CRC using different RNTIs in different states to obtain the contents of the PDCCH and finally obtain the contents on a related PDSCH. The scrambling process of the information of the related PDSCH is also related to a RNTI. Namely, if a SI-RNTI is used as a scrambling code of the PDCCH, RNTI information in a scrambling code of the information of its indicated PDSCH is the SI-RNTI; if a P-RNTI is used as a scrambling code of the PDCCH, RNTI information in a scrambling code of the information of its indicated PDSCH is the P-RNTI; and if a C-RNTI is used as a scrambling code of the PDCCH, RNTI information in a scrambling code of the information of its indicated PDSCH is the C-RNTI.

In addition, in order to improve the blind detection efficiency, a CSS and a USS are divided in the LTE, and different information is searched in different spaces. The common search space refers to a space required to be monitored by all UEs, and is generally used for transmitting a paging, an RAR, a system message, a common uplink power control message of a part of the UEs and the like. The common search space occupies CCEs from 0 to the maximum number 16.

If a high-level configures a UE to demodulate a PDCCH with a CRC scrambled by the SI-RNTI, the UE demodulates the PDCCH and a PDSCH according to Table 1 below. The scrambling code initialization of the PDSCH corresponding to the PDCCH is related to the SI-RNTI.

TABLE 1

| DCI format | Search space | Transmission modes of a PDSCH corresponding to a PDCCH |
|---|---|---|
| DCI format 1C | common | If the number of the antenna of a PBCH is 1, a single antenna port 0 is used, otherwise, transmit diversity is used |
| DCI format 1A | common | If the number of the antenna of a PBCH is 1, a single antenna port 0 is used, otherwise, transmit diversity is used |

If a high-level configures the UE to demodulate a PDCCH with a CRC scrambled by the P-RNTI, the UE may also demodulate the PDCCH and a PDSCH according to Table 1. The scrambling code initialization of the PDSCH corresponding to the PDCCH is just related to the P-RNTI. As the system broadcast message and the paging message of the interfering cell are transmitted on the physical resource corresponding to the CSS, the interfering cell may transmit information with low transmission power or not transmit information in a non-CSS area such as the USS. Meanwhile, when the interfered cell transmits the system broadcast message or the paging message on a physical resource corresponding to the non-CSS, suffered less interference caused by the interfering cell, the probability that the messages are correctly received can be effectively ensured.

Figure 3:
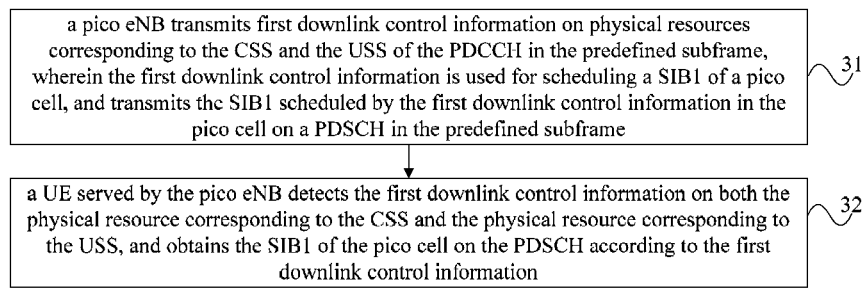
FIG. 3 is a flow diagram of another embodiment of a method for transmitting and receiving downlink control information of the present invention.
Figure 4:
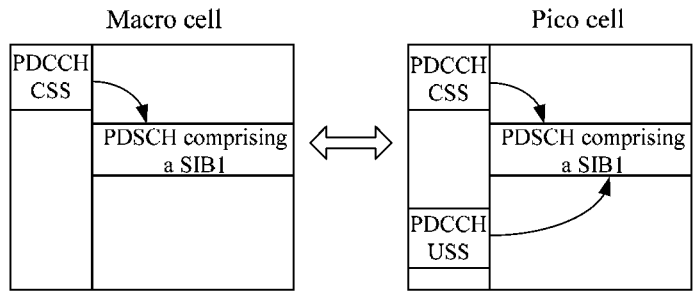
FIG. 4 is a structural diagram of a channel corresponding to FIG. 3.

FIG. 3 is a flow diagram of another embodiment of a method for transmitting and receiving downlink control information of the present invention, and FIG. 4 is a structural diagram of a channel corresponding to FIG. 3. The protected resource which is a resource in the physical resource corresponding to the USS of the PDCCH in the predefined subframe is taken as an example in this embodiment.

In this embodiment, the serving node of the interfered cell transmits first downlink control information on both a first resource and a second resource; the number of a subframe of the first resource is the same as the number of a subframe of the second resource; and the number of a subframe of the PDSCH corresponding to the first downlink control information transmitted on the first resource is the same as that of the subframe of the first resource, and the number of a subframe of the PDSCH corresponding to the first downlink control information transmitted on the second resource is the same as that of the subframe of the second resource.

With reference to FIG. 3, this embodiment comprises:

Step 31: a pico eNB transmits first downlink control information on physical resources corresponding to the CSS and the USS of the PDCCH in the predefined subframe, wherein the first downlink control information is used for scheduling a SIB1 of a pico cell, and transmits the SIB1 scheduled by the first downlink control information in the pico cell on a PDSCH in the predefined subframe.

A CRC corresponding to the first downlink control information is scrambled by a SI-RNTI.

With reference to FIG. 4, a macro cell transmits second scheduling information on a physical resource corresponding to the CSS in the predefined subframe, wherein the second downlink control information is used for scheduling a SIB1 of the macro cell, and the second downlink control information indicates a PDSCH comprising the SIB1 of the macro cell; but in the pico (Pico) cell, the first downlink control information is not only transmitted on the physical resource corresponding to the CSS, but also transmitted on the physical resource corresponding to the USS, and the first downlink control information indicates the PDSCH comprising the SIB1 of the pico cell. For simplicity, the physical resource corresponding to the CSS and the physical resource corresponding to the USS in FIG. 4 are separated from each other. It should be understood that, the physical resource corresponding to the CSS and the physical resource corresponding to the USS may partially overlap, and in addition, the physical resource corresponding to the CSS in the PDCCH of the macro cell and the physical resource corresponding to the CSS in the PDCCH of the pico cell may also partially overlap.

Step 32: a UE served by the pico eNB detects the first downlink control information on both the physical resource corresponding to the CSS and the physical resource corresponding to the USS, and obtains the SIB1 of the pico cell on the PDSCH according to the first downlink control information.

The detection of the UE served by the pico eNB on both the physical resource corresponding to the CSS and the physical resource corresponding to the USS is taken as an example in this embodiment. Alternatively, if the UE served by the pico eNB may detect the scheduling information on the physical resource corresponding to the CSS, the UE may no longer detect the scheduling information on the physical resource corresponding to the USS.

The detection on both the physical resource corresponding to the CSS in the predefined subframe and the protected resource is taken as an example. Specifically, the UE may detect the PDCCH and the PDSCH by adopting Table 2. Different from the prior art, the search space of this embodiment comprises the CSS and the USS.

TABLE 2

| DCI format | Search space | Transmission mode of a PDSCH corresponding to a PDCCH |
|---|---|---|
| DCI format 1C | CSS | If the number of the antenna of a PBCH is 1, a single antenna port 0 is used, otherwise, transmit diversity is used |
| DCI format 1A | CSS and USS | If the number of the antenna of a PBCH is 1, a single antenna port 0 is used, otherwise, transmit diversity is used |

According to Table 2, the UE may performing decoding according to different DCI formats, and then performs descrambling and CRC checking using SI-RNTI to obtain correct DCI, and may obtain the SIB1 message on the PDSCH according to the indication of the correct DCI.

Similarly, for the paging message, a PDCCH and a PDSCH may also be detected by adopting Table 2. Different from the SIB message, the paging message is descrambled by a P-RNTI.

In this embodiment, the scheduling information is included in the resource in the physical resource corresponding to the USS, the first downlink control information is transmitted by selecting a resource suffered less interference in the physical resource corresponding to the USS, and the interference suffered is lower than that corresponding to the CSS, so that the interference can be reduced, and correct modulation of the UE on the DCI is ensured.

Figure 5:
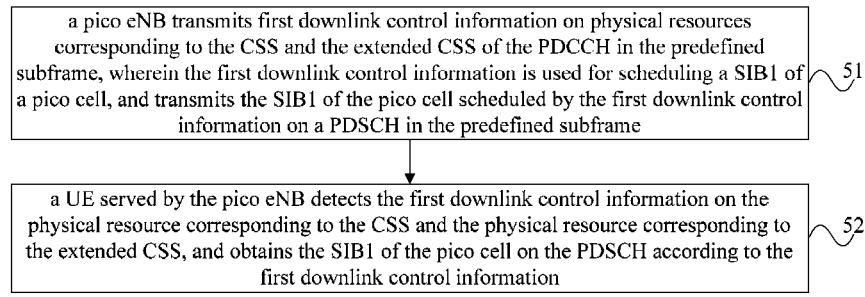
FIG. 5 is a flow diagram of another embodiment of a method for transmitting and receiving downlink control information of the present invention.
Figure 6:
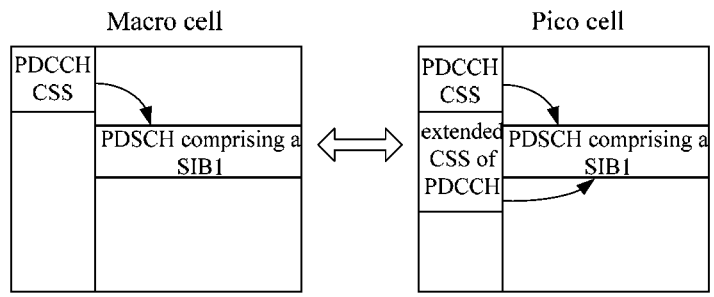
FIG. 6 is a structural diagram of a channel corresponding to FIG. 5.

FIG. 5 is a flow diagram of another embodiment of a method for transmitting and receiving downlink control information of the present invention, and FIG. 6 is a structural diagram of a channel corresponding to FIG. 5. The protected resource which is the physical resource corresponding to an extended CSS of the PDCCH in the predefined subframe is taken as an example.

On a PDCCH, a basic unit for carrying DCI is a control channel element (Control Channel Element, CCE), and each PDCCH consists of 1, 2, 4 or 8 CCEs. A CSS stipulated in the existing protocol consists of 16 CCEs with numbers from 0 to 15. The CSS is extended in this embodiment, for example, CCEs with the numbers from 16 to 23 are referred to as extended CSS.

In this embodiment, the serving node of the interfered cell transmits first downlink control information on both the first resource and the second resource; the number of a subframe of the first resource is the same as the number of a subframe of the second resource; and the number of a subframe of the PDSCH corresponding to the first downlink control information transmitted on the first resource is the same as that of the subframe of the first resource, and the number of a subframe of the PDSCH corresponding to the first downlink control information transmitted on the second resource is the same as that of the subframe of the second resource.

With reference to FIG. 5, this embodiment comprises:

Step 51: a pico eNB transmits first downlink control information on physical resources corresponding to the CSS and the extended CSS of the PDCCH in the predefined subframe, wherein the first downlink control information is used for scheduling a SIB1 of a pico cell, and transmits the SIB1 of the pico cell scheduled by the first downlink control information on a PDSCH in the predefined subframe.

Wherein, a CRC corresponding to the first downlink control information is scrambled by a SI-RNTI.

With reference to FIG. 6, a macro cell transmits second scheduling information on a physical resource corresponding to the CSS in the predefined subframe, wherein the second downlink control information is used for scheduling a SIB1 of the macro cell, and the second downlink control information indicates a PDSCH comprising the SIB1 of the macro cell; but in the pico (Pico) cell, the first downlink control information is not only transmitted on the physical resource corresponding to the CSS, but also transmitted on the physical resource corresponding to extended CSS, and the first downlink control information indicates the PDSCH comprising the SIB1 of the pico cell. For simplicity, various physical resources in FIG. 6 are separated from each other. It should be understood that, the physical resource corresponding to the CSS in the PDCCH of the macro cell and the physical resource corresponding to the CSS in the PDCCH of the pico cell may partially overlap, and the physical resource corresponding to the CSS in the PDCCH of the macro cell and the physical resource corresponding to the extended CSS in the PDCCH of the pico cell may also partially overlap.

Step 52: a UE served by the pico eNB detects the first downlink control information on the physical resource corresponding to the CSS and the physical resource corresponding to the extended CSS, and obtains the SIB1 of the pico cell on the PDSCH according to the first downlink control information.

Similarly, the aforementioned transmitted scheduling information for scheduling the SIB1 is scrambled by the SI-RNTI, so the UE needs to use the SI-RNTI for descrambling.

Wherein, the detection of the UE served by the pico eNB on both the physical resource corresponding to the CSS and the physical resource corresponding to the extended CSS is taken as an example in this embodiment. Alternatively, if the UE served by the pico eNB may detect the scheduling information on the physical resource corresponding to the CSS, the UE may no longer detect the scheduling information on the physical resource corresponding to the extended CSS.

The detection on both the physical resource corresponding to the CSS of the PDCCH in the predefined subframe and the protected resource is taken as an example. Different from the prior art, search in both the CSS and the extended CSS is required in this embodiment, as shown in Table 3.

TABLE 3

| DCI format | Search space | Transmission mode of a PDSCH corresponding to a PDCCH |
|---|---|---|
| DCI format 1C | CSS | If the number of the antenna of a PBCH is 1, a single antenna port 0 is used, otherwise, transmit diversity is used |
| DCI format 1A | CSS and extended CSS | If the number of the antenna of a PBCH is 1, a single antenna port 0 is used, otherwise, transmit diversity is used |

Similarly, for the paging message, the UE may also detect a PDCCH and a PDSCH by adopting table 3. Different from the SIB, the paging message is descrambled by a P-RNTI.

In this embodiment, the scheduling information is included in the physical resource corresponding to the extended CSS, the first downlink control information is transmitted by selecting a resource suffered less interference in the physical resource corresponding to the extended CSS, and the interference suffered is lower than that corresponding to the CSS, so that the interference can be reduced, and correct modulation of the UE on the DCI is ensured. In addition, by extending the CSS in this embodiment, the scheduling information may be transmitted only once for all UEs and needs not to be transmitted for each interfered UE, therefore the overhead can be reduced.

The scheduling information is carried on the PDCCH, as an example in the aforementioned two embodiments. Moreover, the scheduling information may also be carried on an E-PDCCH. The E-PDCCH is specifically described as follows:

as uplink/downlink data scheduling of each user needs to be indicated through the PDCCH, the capacity of the PDCCH area directly limits the capacity for the cell to simultaneously schedule users.

In order to provide higher spectral efficiency and cell-edge user performance, in an LTE version Release 11 (Rel.11) system, a more advanced technology is introduced, so that the number of users simultaneously served by a cell is significantly increased. In this way, the PDCCH area of 3 maximum OFDM symbols in the LTE cannot meet the requirement of Rel.11, and new PDCCH resources, namely an enhanced-PDCCH (E-PDCCH, Enhanced-PDCCH) area, for transmitting data scheduling information of more R11 users and for solving interference problem of the PDCCH in an interference scenario, are required to be defined. In the LTE Rel.11 system, control channels of the Rel.11 users may be located in the PDCCH area of the previous several OFDM symbols, or in the E-PDCCH area. The E-PDCCH area uses partial time-frequency resources of the original PDSCH area, which may be multiplexed with the PDSCH with frequency division multiplexing (FDM) or other modes.

Figure 7:
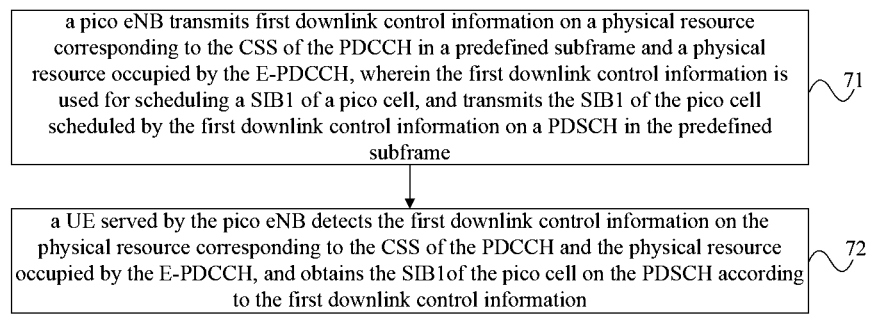
FIG. 7 is a flow diagram of another embodiment of a method for transmitting and receiving downlink control information of the present invention.
Figure 8:
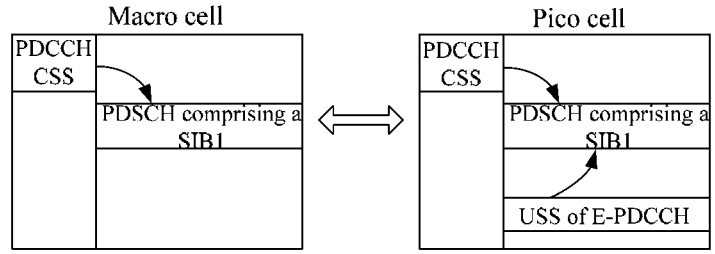
FIG. 8 is a structural diagram of a channel corresponding to FIG. 7.

FIG. 7 is a flow diagram of another embodiment of a method for transmitting and receiving downlink control information of the present invention, and FIG. 8 is a structural diagram of a channel corresponding to FIG. 7. The protected resource which is an E-PDCCH is taken as an example in this embodiment.

In this embodiment, the serving node of the interfered cell transmits first downlink control information on both the first resource and the second resource; the number of a subframe of the first resource is the same as the number of a subframe of the second resource; and the number of a subframe of the PDSCH corresponding to the first downlink control information transmitted on the first resource is the same as that of the subframe of the first resource, and the number of a subframe of the PDSCH corresponding to the first downlink control information transmitted on the second resource is the same as that of the subframe of the second resource.

With reference to FIG. 7, this embodiment comprises:

Step 71: a pico eNB transmits first downlink control information on a physical resource corresponding to the CSS of the PDCCH in a predefined subframe and a physical resource occupied by the E-PDCCH, wherein the first downlink control information is used for scheduling a SIB1 of a pico cell, and transmits the SIB1 of the pico cell scheduled by the first downlink control information on a PDSCH in the predefined subframe.

Wherein, a CRC corresponding to the first downlink control information is scrambled by a SI-RNTI.

With reference to FIG. 8, a macro cell transmits second downlink control information on the physical resource corresponding to the CSS of the PDCCH in the predefined subframe, wherein the second downlink control information is used for scheduling a SIB1 of the macro cell, and the second downlink control information indicates a PDSCH comprising the SIB1 of the macro cell; but in the pico (Pico) cell, the first downlink control information is not only transmitted on the physical resource corresponding to the CSS of the PDCCH, but also transmitted on the physical resource occupied by the E-PDCCH, and the first downlink control information indicates the PDSCH comprising the SIB1 of the pico cell.

Specifically, the first downlink control information may be transmitted on a physical resource corresponding to a CSS of the E-PDCCH or a physical resource corresponding to a USS of the E-PDCCH.

Step 72: a UE served by the pico eNB detects the first downlink control information on the physical resource corresponding to the CSS of the PDCCH and the physical resource occupied by the E-PDCCH, and obtains the SIB1 of the pico cell on the PDSCH according to the first downlink control information.

The detection on both the physical resource corresponding to the CSS of the PDCCH in the predefined subframe and the protected resource is taken as an example. Specifically, if it is specified that the first downlink control information is transmitted by using the physical resource corresponding to the CSS of the E-PDCCH, the UE searches the physical resource corresponding to the CSS of the PDCCH and the physical resource corresponding to the CSS of the E-PDCCH; or, if it is specified that the first downlink control information is transmitted by using the physical resource corresponding to the USS of the E-PDCCH, the UE searches the physical resource corresponding to the CSS of the PDCCH and the physical resource corresponding to the USS of the E-PDCCH.

Namely, the UE may perform demodulation by adopting Table 4.

TABLE 4

| DCI format | Search space | Transmission mode of a PDSCH corresponding to a PDCCH |
|---|---|---|
| DCI format 1C | CSS of PDCCH | If the number of the antenna of a PBCH is 1, a single antenna port 0 is used, otherwise, transmit diversity is used |
| DCI format 1A | CSS of PDCCH and E-PDCCH (specifically, CSS of E-PDCCH or USS of E-PDCCH) | If the number of the antenna of a PBCH is 1, a single antenna port 0 is used, otherwise, transmit diversity is used |

The detection of the UE served by the pico eNB on both the physical resource corresponding to the CSS and the physical resource occupied by the E-PDCCH is taken as an example in this embodiment. Alternatively, if the UE served by the pico eNB may detect the scheduling information on the physical resource corresponding to the CSS, the UE may no longer detect the scheduling information on the physical resource occupied by the E-PDCCH.

In this embodiment, the scheduling information is included in the E-PDCCH, the macro cell can reduce transmission power on the resource corresponding to the E-PDCCH, thus the interference to the E-PDCCH is lower than that in the CSS of the PDCCH, so that the interference can be reduced, and correct modulation of the UE on the DCI is ensured.

The scheduling information is carried in the predefined subframe, as an example in above embodiments, and the scheduling information may also be carried in other subframes. For example, for the SIB1 message, the predefined subframe is the No. 5 subframe, and in the embodiment of the present invention, it may also be stipulated that the scheduling information is also carried in another subframe, e.g., the No. 4 subframe.

Figure 9:
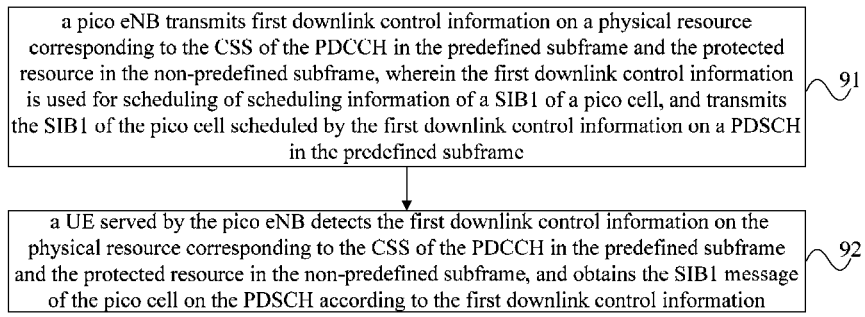
FIG. 9 is a flow diagram of another embodiment of a method for transmitting and receiving downlink control information of the present invention.
Figure 10:
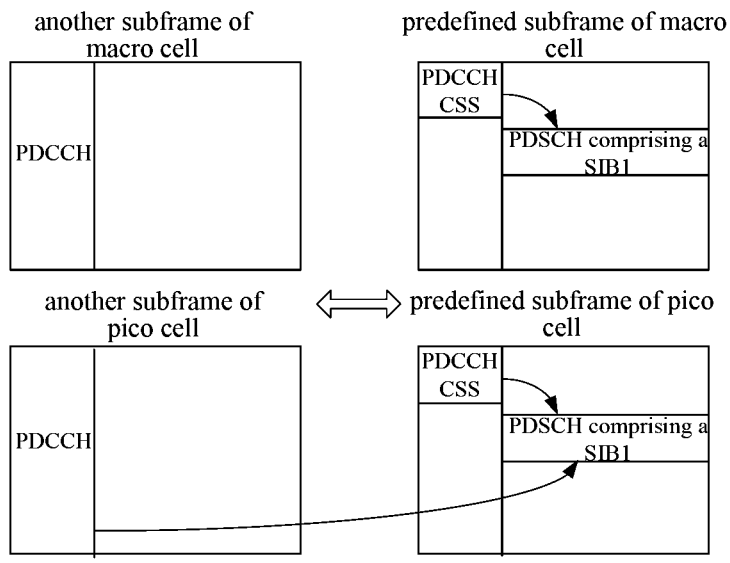
FIG. 10 is a structural diagram of a channel corresponding to FIG. 9.

FIG. 9 is a method flow diagram of another embodiment of a method for transmitting and receiving downlink control information of the present invention, and FIG. 10 is a structural diagram of a channel corresponding to FIG. 9. The protected resource is a non-predefined subframe, as an example in this embodiment, and in this embodiment the scheduling information in the non-predefined subframe and the scheduling information in the predefined subframe indicate a same PDSCH.

In this embodiment, the number of a subframe of the first resource is different from the number of a subframe of the second resource;

the number of a subframe of the PDSCH corresponding to the first downlink control information transmitted on the second resource is the same as that of the subframe of the second resource, and the number of a subframe of the PDSCH corresponding to the first downlink control information transmitted on the first resource is the same as that of the subframe of the PDSCH corresponding to the first downlink control information transmitted on the second resource. Alternatively, it may also be, the number of a subframe of the PDSCH corresponding to the first downlink control information transmitted on the first resource is the same as that of the subframe of the first resource, and the number of a subframe of the PDSCH corresponding to the first downlink control information transmitted on the second resource is the same as that of the subframe of the PDSCH corresponding to the first downlink control information transmitted on the first resource.

With reference to FIG. 9, this embodiment comprises:

Step 91: a pico eNB transmits first downlink control information on a physical resource corresponding to the CSS of the PDCCH in the predefined subframe and the protected resource in the non-predefined subframe, wherein the first downlink control information is used for scheduling of scheduling information of a SIB1 of a pico cell, and transmits the SIB1 of the pico cell scheduled by the first downlink control information on a PDSCH in the predefined subframe.

Wherein, a CRC corresponding to the first downlink control information is scrambled by a SI-RNTI.

With reference to FIG. 10, a macro cell transmits second downlink control information on the physical resource corresponding to the CSS in the predefined subframe, wherein the second downlink control information is used for scheduling a SIB1 of the macro cell, and the second downlink control information indicates a PDSCH comprising the SIB1 of the macro cell; but in the pico (Pico) cell, the first downlink control information is not only transmitted in the predefined subframe, but also transmitted in the non-predefined subframe, and the first downlink control information also indicates a PDSCH comprising the SIB1 of the pico cell in the predefined subframe.

Specifically, the above protected resource in the non-predefined subframe may be a physical resource corresponding to a USS of a PDCCH in the non-predefined subframe, a physical resource corresponding to an extended CSS of the PDCCH in the non-predefined subframe, a physical resource corresponding to a USS of an E-PDCCH in the non-predefined subframe or a physical resource corresponding to a CSS of the E-PDCCH in the non-predefined subframe.

Step 92: a UE served by the pico eNB detects the first downlink control information on the physical resource corresponding to the CSS of the PDCCH in the predefined subframe and the protected resource in the non-predefined subframe, and obtains the SIB1 message of the pico cell on the PDSCH according to the first downlink control information.

Similar to the above embodiments, the UE descrambles the received DCI using the SI-RNTI in a search space, and demodulates the PDSCH according to the indication of the DCI. The detection on both the physical resource corresponding to the CSS of the PDCCH in the predefined subframe and the protected resource is taken as an example. Different from the above embodiments, the search space of this embodiment comprises the protected resource in the non-predefined subframe besides the CSS of the PDCCH in the predefined subframe. Certainly, the non-predefined subframe required to be detected may also be predetermined, for example, the detection is also required in the No. 4 subframe; and the protected resource, such as a USS of a PDCCH in the No. 4 subframe, may also be predetermined.

In this embodiment, the detection of the UE served by the pico eNB in both the predefined subframe and the non-predefined subframe is taken as an example. Alternatively, if the UE served by the pico eNB may detect the scheduling information in the predefined subframe, the UE may no longer detect the scheduling information in the non-predefined subframe.

In this embodiment, the scheduling information is included in the non-predefined subframe, the first downlink control information is transmitted by selecting the non-predefined subframe suffered lower interference, and the interference suffered is lower than that corresponding to the CSS of the PDCCH in the predefined subframe, so that the interference can be reduced, and correct modulation of the UE on the DCI is ensured.

Figure 11:
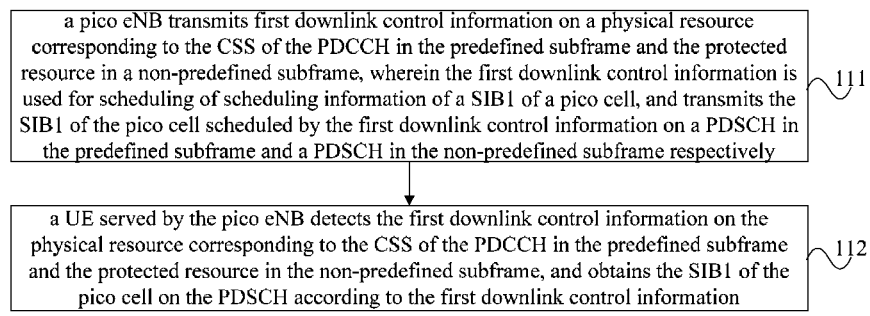
FIG. 11 is a flow diagram of another embodiment of a method for transmitting and receiving downlink control information of the present invention.
Figure 12:
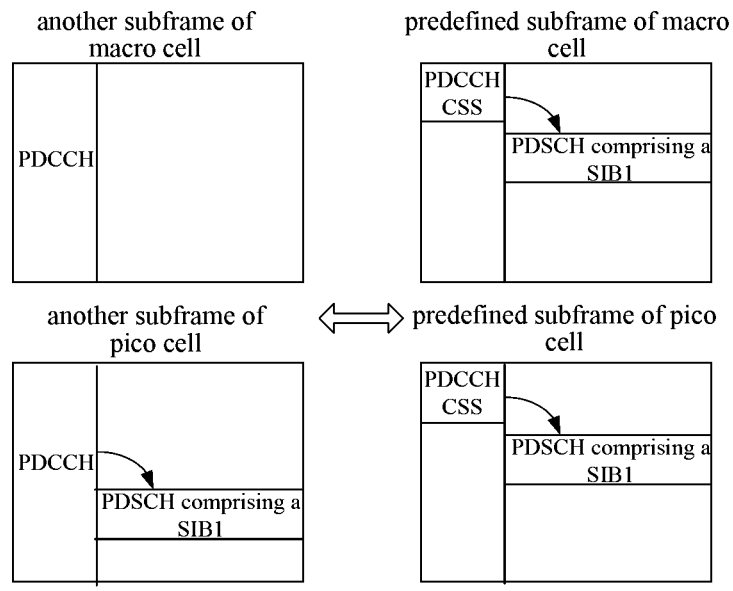
FIG. 12 is a structural diagram of a channel corresponding to FIG. 11.

FIG. 11 is a method flow diagram of another embodiment of a method for transmitting and receiving downlink control information of the present invention, and FIG. 12 is a structural diagram of a channel corresponding to FIG. 11. The protected resource which is a non-predefined subframe is taken as an example in this embodiment, and in this embodiment scheduling information in the non-predefined subframe and scheduling information in a predefined subframe indicate different PDSCHs.

The number of a subframe of the first resource is different from the number of a subframe of the second resource;

the number of a subframe of a physical downlink shared channel (PDSCH) corresponding to the first downlink control information transmitted on the first resource is the same as that of the subframe of the first resource, and the number of a subframe of the PDSCH corresponding to the first downlink control information transmitted on the second resource is the same as that of the subframe of the second resource.

With reference to FIG. 11, this embodiment comprises:

Step 111: a pico eNB transmits first downlink control information on a physical resource corresponding to the CSS of the PDCCH in the predefined subframe and the protected resource in a non-predefined subframe, wherein the first downlink control information is used for scheduling of scheduling information of a SIB1 of a pico cell, and transmits the SIB1 of the pico cell scheduled by the first downlink control information on a PDSCH in the predefined subframe and a PDSCH in the non-predefined subframe respectively.

Wherein, a CRC corresponding to the first downlink control information is scrambled by the SI-RNTI.

With reference to FIG. 12, a macro cell transmits second downlink control information on the physical resource corresponding to the CSS in the predefined subframe, wherein the second downlink control information is used for scheduling a SIB1 of the macro cell, and the second downlink control information indicates a PDSCH comprising the SIB1 of the macro cell; but in the pico (Pico) cell, the first downlink control information is not only transmitted in the predefined subframe, but also transmitted in the non-predefined subframe, and the PDSCH indicated by the first downlink control information in the non-predefined subframe is different from the PDSCH indicated by the first downlink control information in the predefined subframe.

Specifically, the above protected resource in the non-predefined subframe may be a physical resource corresponding to a USS of a PDCCH in the non-predefined subframe, a physical resource corresponding to an extended CSS of the PDCCH in the non-predefined subframe, a physical resource corresponding to a USS of an E-PDCCH in the non-predefined subframe or a physical resource corresponding to a CSS of the E-PDCCH in the non-predefined subframe.

Step 112: a UE served by the pico eNB detects the first downlink control information on the physical resource corresponding to the CSS of the PDCCH in the predefined subframe and the protected resource in the non-predefined subframe, and obtains the SIB1 of the pico cell on the PDSCH according to the first downlink control information.

The detection of the UE served by the pico eNB in both the predefined subframe and the non-predefined subframe is taken as an example in this embodiment. Alternatively, if the UE served by the pico eNB may detect the scheduling information in the predefined subframe, the UE may no longer detect the scheduling information in the non-predefined subframe.

Particularly, the UE probably detects the first downlink control information and third downlink control information in the non-predefined subframe, and the third downlink control information refers to scheduling information for scheduling a system broadcast message (such as a SIB2 and a SIB3) except the SIB1 of the interfered cell or a MIB. As both the first downlink control information and the third downlink control information are information scrambled by the SI-RNTI, the UE cannot distinguish the system broadcast message scheduled by the first downlink control information and the system broadcast message scheduled by the third downlink control information. At this moment, the current PDSCH which is the SIB1 may be indicated in the information of the PDSCH indicated by the first downlink control information, or the current PDSCH which is the system broadcast message except the SIB1 message or the MIB may be indicated in the information of the PDSCH indicated by the third downlink control information; or, without any stipulation, the UE determines that the information on the current PDSCH is the SIB1 message or the system broadcast message except the SIB1 message or the MIB according to the subframe of the PDSCH indicated by the received downlink control information.

That is, alternatively, when the number of the subframe of the first resource is different from that of the subframe of the second resource, and the first downlink control information is used for scheduling the SIB1 transmitted by the serving node of the interfered cell on the physical downlink shared channel (PDSCH) of the interfered cell serving node, data transmitted on the PDSCH corresponding to the first downlink control information comprises first indicating information, wherein the first indicating information is used for indicating that the data transmitted on the PDSCH corresponding to the first downlink control information comprises the SIB1; or, the subframe number of the subframe of the PDSCH corresponding to the first downlink control information is used for identifying that the data transmitted on the PDSCH corresponding to the first downlink control information comprises the SIB1.

Or, alternatively, when the number of the subframe of the first resource is different from that of the subframe of the second resource, and the first downlink control information is used for scheduling the SIB1 transmitted by the serving node of the interfered cell on the PDSCH of the interfered cell, the method further comprises:

the serving node of the interfered cell transmits third downlink control information, wherein the third downlink control information comprises scheduling information for scheduling a system broadcast message except a master information block (MIB) and the SIB1, and the system broadcast message except the master information block (MIB) and the SIB1 is transmitted by the serving node of the interfered cell on the PDSCH of the interfered cell serving node;

wherein, data transmitted on the PDSCH corresponding to the third downlink control information comprises second indicating information, wherein the second indicating information is used for indicating that the data transmitted on the PDSCH corresponding to the third downlink control information comprises the system broadcast message except the master information block (MIB) and the SIB1; or, the subframe number of the PDSCH corresponding to the third downlink control information is used for identifying that data transmitted on the PDSCH corresponding to the third downlink control information comprises the system broadcast message except the master information block (MIB) and the SIB1.

In this embodiment, the scheduling information is included in the non-predefined subframe, the first downlink control information is transmitted by selecting the non-predefined subframe suffered lower interference, and the interference suffered is lower than that corresponding to the CSS of the PDCCH in the predefined subframe, so that the interference can be reduced, and correct modulation of the UE on the DCI is ensured.

Figure 13:
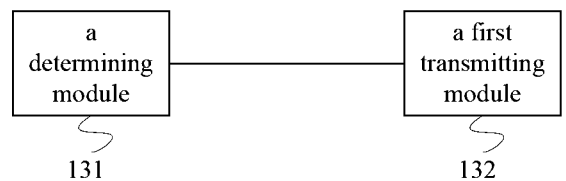
FIG. 13 is a structural diagram of an embodiment of a serving node of the present invention.

FIG. 13 is a structural diagram of an embodiment of a serving node of the present invention, comprising a determining module 131 and a first transmitting module 132;

the determining module 131 is configured to determine a first resource, wherein the first resource is located in at least one of the followings:

a physical resource comprised in a UE-specific search space (USS) of a physical downlink control channel (PDCCH), an extended physical resource obtained by extending a common search space (CSS) of the PDCCH, a physical resource comprised in a USS of an enhanced physical downlink control channel (E-PDCCH), and a physical resource comprised in a CSS of the E-PDCCH;

the first transmitting module 132 is configured to transmit first downlink control information of an interfered cell on the first resource according to information of the first resource determined by the determining module, wherein the first downlink control information comprises scheduling information for scheduling a paging message and/or a system information block 1 (SIB1) transmitted by the serving node of the interfered cell, and the paging message and/or the SIB1 are/is transmitted by the serving node of the interfered cell on a physical downlink shared channel (PDSCH) of the interfered cell.

Alternatively, the node further comprises:

a second transmitting module, configured to transmit the first downlink control information on a second resource;

the second resource is a resource used by a serving node of an interfering cell to transmit second downlink control information in the interfering cell, and the second downlink control information comprises scheduling information for scheduling a paging message and/or a SIB1 message transmitted by the serving node of the interfering cell on a physical downlink shared channel (PDSCH) of the interfering cell.

Alternatively, the number of a subframe of the first resource used by the first transmitting module is the same as the number of a subframe of the second resource used by the second transmitting module;

the number of a subframe of the physical downlink shared channel (PDSCH) corresponding to the first downlink control information transmitted on the first resource is the same as that of the subframe of the first resource, and the number of a subframe of the PDSCH corresponding to the first downlink control information transmitted on the second resource is the same as that of the subframe of the second resource.

Alternatively, the number of a subframe of the first resource used by the first transmitting module is different from the number of a subframe of the second resource used by the second transmitting module;

the number of a subframe of the physical downlink shared channel (PDSCH) corresponding to the first downlink control information transmitted on the first resource is the same as that of the subframe of the first resource, and the number of a subframe of the PDSCH corresponding to the first downlink control information transmitted on the second resource is the same as that of the subframe of the second resource; or, the number of a subframe of the physical downlink shared channel (PDSCH) corresponding to the first downlink control information transmitted on the first resource is the same as that of the subframe of the first resource, and the number of a subframe of the PDSCH corresponding to the first downlink control information transmitted on the second resource is the same as that of the subframe of the physical downlink shared channel (PDSCH) corresponding to the first downlink control information transmitted on the first resource; or, the number of a subframe of the physical downlink shared channel (PDSCH) corresponding to the first downlink control information transmitted on the second resource is the same as that of the subframe of the second resource, and the number of a subframe of the PDSCH corresponding to the first downlink control information transmitted on the first resource is the same as that of the subframe of the physical downlink shared channel (PDSCH) corresponding to the first downlink control information transmitted on the second resource.

Alternatively, when the number of a subframe of the first resource is different from the number of a subframe of the second resource, and the first downlink control information is used for scheduling the SIB1 transmitted by the serving node of the interfered cell on the physical downlink shared channel (PDSCH) of the interfered cell, data transmitted on the PDSCH corresponding to the first downlink control information transmitted by the first transmitting module comprises first indicating information, wherein the first indicating information is used for indicating that the data transmitted on the PDSCH corresponding to the first downlink control information comprises the SIB1; or, the subframe number of a subframe of the PDSCH corresponding to the first downlink control information transmitted by the first transmitting module is used for identifying that data transmitted on the PDSCH corresponding to the first downlink control information contains the SIB1.

Alternatively, when the number of a subframe of the first resource is different from the number of a subframe of the second resource, and the first downlink control information is used for scheduling the SIB1 transmitted by the serving node of the interfered cell on the physical downlink shared channel (PDSCH) of the interfered cell, the node further comprises:

a third transmitting module, configured to transmit third downlink control information, wherein the third downlink control information comprises scheduling information for scheduling a system broadcast message except a master information block (MIB) and the SIB1, and the system broadcast message except the master information block (MIB) and the SIB1 is transmitted by the serving node of the interfered cell on the PDSCH of the interfered cell;

data transmitted on the PDSCH corresponding to the third downlink control information comprises second indicating information, wherein the second indicating information is used for indicating that the data transmitted on the PDSCH corresponding to the third downlink control information comprises the system broadcast message except the master information block (MIB) and the SIB1; or, the subframe number of the PDSCH corresponding to the third downlink control information is used for identifying that data transmitted on the PDSCH corresponding to the third downlink control information comprises the system broadcast message except the master information block (MIB) and the SIB1.

Alternatively, the serving node of the interfered cell is a low-power serving node; and the serving node of the interfering cell is a high-power serving node.

Alternatively, the extended physical resource obtained by extending a CSS of the PDCCH comprises:

an expanded CCE with a number greater than or equal to 16 belonging to the CSS, obtained by extending the CSS consisting of control channel elements (CCEs) with numbers from 0 to 15.

In this embodiment, as the scheduling information of the interfered cell is transmitted on the first resource, the interference caused by the interfering cell can be reduced as much as possible, so as to ensure that the UE of the interfered cell can correctly demodulate the downlink control information.

Figure 14:
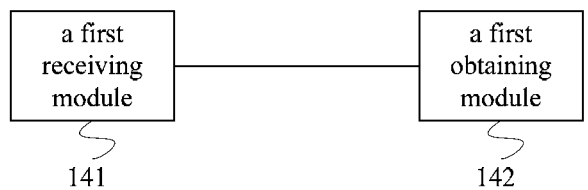
FIG. 14 is a structural diagram of an embodiment of a user equipment of the present invention.

FIG. 14 is a structural diagram of an embodiment of a user equipment of the present invention. The equipment comprises a first receiving module 141 and a first obtaining module 142;

the first receiving module 141 is configured to receive first downlink control information transmitted by a serving node of an interfered cell on a first resource, wherein the first resource is located in at least one of the followings: a physical resource comprised in a UE-specific search space (USS) of a physical downlink control channel (PDCCH), an extended physical resource obtained by extending a common search space (CSS) of the PDCCH, a physical resource comprised in a USS of an enhanced physical downlink control channel (E-PDCCH), and a physical resource comprised in a CSS of the E-PDCCH; the first downlink control information comprises scheduling information for scheduling a paging message and/or a SIB1 transmitted by the serving node of the interfered cell;

the first obtaining module 142 is configured to receive the first downlink control information transmitted by the first receiving module and obtain data on a physical downlink shared channel (PDSCH) indicated by the first downlink control information according to the first downlink control information, wherein the data on the PDSCH comprises the paging message and/or the SIB1.

Alternatively, the equipment further comprises:

a second receiving module, configured to receive the first downlink control information transmitted on a second resource by the serving node, wherein the second resource is a resource used by a serving node of an interfering cell to transmit second downlink control information in the interfering cell, and the second downlink control information comprises scheduling information for scheduling a paging message and/or a SIB1 message transmitted by the serving node of the interfering cell on a physical downlink shared channel (PDSCH) of the interfering cell.

Alternatively, the number of a subframe of the first resource is the same as the number of a subframe of the second resource;

the number of a subframe of the physical downlink shared channel (PDSCH) corresponding to the first downlink control information transmitted on the first resource is the same as that of the subframe of the first resource, and the number of a subframe of the PDSCH corresponding to the first downlink control information transmitted on the second resource is the same as that of the subframe of the second resource.

Alternatively, the number of a subframe of the first resource is different from the number of a subframe of the second resource;

the number of a subframe of the physical downlink shared channel (PDSCH) corresponding to the first downlink control information transmitted on the first resource is the same as that of the subframe of the first resource, and the number of a subframe of the PDSCH corresponding to the first downlink control information transmitted on the second resource is the same as that of the subframe of the second resource; or, the number of a subframe of the physical downlink shared channel (PDSCH) corresponding to the first downlink control information transmitted on the first resource is the same as that of the subframe of the first resource, and the number of a subframe of the PDSCH corresponding to the first downlink control information transmitted on the second resource is the same as that of the subframe of the physical downlink shared channel (PDSCH) corresponding to the first downlink control information transmitted on the first resource; or, the number of a subframe of the physical downlink shared channel (PDSCH) corresponding to the first downlink control information transmitted on the second resource is the same as that of the subframe of the second resource, and the number of a subframe of the PDSCH corresponding to the first downlink control information transmitted on the first resource is the same as that of the subframe of the physical downlink shared channel (PDSCH) corresponding to the first downlink control information transmitted on the second resource.

Alternatively, when the number of a subframe of the first resource is different from that of the subframe of the second resource, and the first downlink control information is used for scheduling the SIB1 transmitted by the serving node of the interfered cell on the physical downlink shared channel (PDSCH) of the interfered cell, the data on the PDSCH obtained by the first obtaining module further comprises first indicating information, wherein the first indicating information is used for indicating that the data on the PDSCH comprises the SIB1; or, the subframe number of a subframe of the PDSCH, obtained by the first obtaining module, is used for identifying that the data on the PDSCH corresponding to the first downlink control information comprises the SIB1.

Alternatively, when the number of a subframe of the first resource is different from the number of a subframe of the second resource, and when the first downlink control information is used for scheduling the SIB1 transmitted by the serving node of the interfered cell on the physical downlink shared channel (PDSCH) of the interfered cell, the equipment further comprises:

a third receiving module, configured to receive third downlink control information, wherein the third downlink control information comprises scheduling information for scheduling a system broadcast message except a master information block (MIB) and the SIB1, and the system broadcast message except the master information block (MIB) and the SIB1 is transmitted by the serving node of the interfered cell on the PDSCH of the interfered cell; data transmitted on the PDSCH corresponding to the third downlink control information comprises second indicating information, wherein the second indicating information is used for indicating that the data transmitted on the PDSCH corresponding to the third downlink control information comprises the system broadcast message except the master information block (MIB) and the SIB1; or, the subframe number of the PDSCH corresponding to the third downlink control information is used for identifying that data transmitted on the PDSCH corresponding to the third downlink control information comprises the system broadcast message except the master information block (MIB) and the SIB1.

Alternatively, the serving node of the interfered cell is a low-power serving node; and the serving node of the interfering cell is a high-power serving node.

Alternatively, the extended physical resource obtained by extending a CSS of the PDCCH comprises:

an expanded CCE with a number greater than or equal to 16 belonging to the CSS, obtained by extending the CSS consisting of control channel elements (CCEs) with numbers from 0 to 15.

In this embodiment, as the scheduling information of the interfered cell is transmitted on the first resource, the interference caused by the interfering cell can be reduced as much as possible, so as to ensure that the UE of the interfered cell can correctly demodulate the downlink control information.

Figure 15:
FIG. 15 is a structural diagram of another embodiment of a serving node of the present invention.

FIG. 15 is a structural diagram of another embodiment of a serving node of the present invention, comprising a processor 151 and a transmitter 152;

the processor 151 is configured to:

determine a first resource, wherein the first resource is located in at least one of the followings: a physical resource comprised in a UE-specific search space (USS) of a physical downlink control channel (PDCCH), an extended physical resource obtained by extending a common search space (CSS) of the PDCCH, a physical resource comprised in a USS of an enhanced physical downlink control channel (E-PDCCH), and a physical resource comprised in a CSS of the E-PDCCH;

the transmitter 152 is configured to transmit first downlink control information of an interfered cell on the first resource, wherein the first downlink control information comprises scheduling information for scheduling a paging message and/or a system information block 1 (SIB1) transmitted by a serving node of the interfered cell, and the paging message and/or the SIB1 are/is transmitted by the serving node of the interfered cell on a physical downlink shared channel (PDSCH) of the interfered cell.

Alternatively, the transmitter is further configured to:

transmit the first downlink control information on a second resource;

the second resource is a resource used by a serving node of an interfering cell to transmit second downlink control information in the interfering cell, and the second downlink control information comprises scheduling information for scheduling a paging message and/or a SIB1 message transmitted by the serving node of the interfering cell on a physical downlink shared channel (PDSCH) of the interfering cell.

Alternatively, the number of a subframe of the first resource is the same as the number of a subframe of the second resource;

the number of a subframe of the physical downlink shared channel (PDSCH) corresponding to the first downlink control information transmitted on the first resource is the same as that of the subframe of the first resource, and the number of a subframe of the PDSCH corresponding to the first downlink control information transmitted on the second resource is the same as that of the subframe of the second resource.

Alternatively, the number of a subframe of the first resource is different from the number of a subframe of the second resource;

the number of a subframe of the physical downlink shared channel (PDSCH) corresponding to the first downlink control information transmitted on the first resource is the same as that of the subframe of the first resource, and the number of a subframe of the PDSCH corresponding to the first downlink control information transmitted on the second resource is the same as that of the subframe of the second resource; or, the number of a subframe of the physical downlink shared channel (PDSCH) corresponding to the first downlink control information transmitted on the first resource is the same as that of the subframe of the first resource, and the number of a subframe of the PDSCH corresponding to the first downlink control information transmitted on the second resource is the same as the number of a subframe of the physical downlink shared channel (PDSCH) corresponding to the first downlink control information transmitted on the first resource; or, the number of the subframe of the physical downlink shared channel (PDSCH) corresponding to the first downlink control information transmitted on the second resource is the same as that of the subframe of the second resource, and the number of a subframe of the PDSCH corresponding to the first downlink control information transmitted on the first resource is the same as that of the subframe of the physical downlink shared channel (PDSCH) corresponding to the first downlink control information transmitted on the second resource.

Alternatively, when the number of a subframe of the first resource is different from the number of a subframe of the second resource, and the first downlink control information is used for scheduling the SIB1 transmitted by the serving node of the interfered cell on the physical downlink shared channel (PDSCH) of the interfered cell, data transmitted on the PDSCH corresponding to the first downlink control information transmitted by the transmitter comprises first indicating information, wherein the first indicating information is used for indicating that the data transmitted on the PDSCH corresponding to the first downlink control information comprises the SIB1; or, the subframe number of a subframe of the PDSCH corresponding to the first downlink control information transmitted by the transmitter is used for identifying that data transmitted on the PDSCH corresponding to the first downlink control information comprises the SIB1.

Alternatively, when the number of a subframe of the first resource is different from the number of a subframe of the second resource, and the first downlink control information is used for scheduling the SIB1 transmitted by the serving node of the interfered cell on the physical downlink shared channel (PDSCH) of the interfered cell, the transmitter is further configured to:

transmit third downlink control information, wherein the third downlink control information comprises scheduling information for scheduling a system broadcast message except a master information block (MIB) and the SIB1, and the system broadcast message except the master information block (MIB) and the SIB1 is transmitted by the serving node of the interfered cell on the PDSCH of the interfered cell;

data transmitted on the PDSCH corresponding to the third downlink control information comprises second indicating information, wherein the second indicating information is used for indicating that the data transmitted on the PDSCH corresponding to the third downlink control information comprises the system broadcast message except the master information block (MIB) and the SIB1; or, the subframe number of the PDSCH corresponding to the third downlink control information is used for identifying that data transmitted on the PDSCH corresponding to the third downlink control information comprises the system broadcast message except the master information block (MIB) and the SIB1.

Alternatively, the serving node of the interfered cell is a low-power serving node; and the serving node of the interfering cell is a high-power serving node.

Alternatively, the extended physical resource obtained by extending a CSS of the PDCCH comprises:

an extended CCE with a numbers greater than or equal to 16 belonging to the CSS, obtained by extending the CSS consisting of control channel elements (CCEs) with numbers from 0 to 15.

In this embodiment, as the scheduling information of the interfered cell is transmitted on the first resource, the interference caused by the interfering cell can be reduced as much as possible, so as to ensure that the UE of the interfered cell can correctly demodulate the downlink control information.

Figure 16:
FIG. 16 is a structural diagram of another embodiment of a user equipment of the present invention.

FIG. 16 is a structural diagram of another embodiment of a user equipment of the present invention, comprising a receiver 161 and a processor 162;

the receiver 161 is configured to receive first downlink control information transmitted by a serving node of an interfered cell on a first resource, wherein the first resource is located in at least one of the followings: a physical resource comprised in a UE-specific search space (USS) of a physical downlink control channel (PDCCH), an extended physical resource obtained by extending a common search space (CSS) of the PDCCH, a physical resource comprised in a USS of an enhanced physical downlink control channel (E-PDCCH), and a physical resource comprised in a CSS of the E-PDCCH; the first downlink control information comprises scheduling information for scheduling a paging message and/or a system information block 1 (SIB1) transmitted by the serving node of the interfered cell;

the processor 162 is configured to obtain data on a physical downlink shared channel (PDSCH) indicated by the first downlink control information according to the first downlink control information, wherein the data on the PDSCH comprises the paging message and/or the SIB1.

Alternatively, the receiver is further configured to:

receive the first downlink control information transmitted on a second resource by the serving node, wherein the second resource is a resource used by a serving node of an interfering cell to transmit second downlink control information in the interfering cell, and the second downlink control information comprises scheduling information for scheduling a paging message and/or a SIB1 message transmitted by the serving node of the interfering cell on a physical downlink shared channel (PDSCH) of the interfering cell.

Alternatively, the number of a subframe of the first resource is the same as the number of a subframe of the second resource;

the number of a subframe of the physical downlink shared channel (PDSCH) corresponding to the first downlink control information received on the first resource by the receiver is the same as that of the subframe of the first resource, and the number of a subframe of the PDSCH corresponding to the first downlink control information transmitted on the second resource is the same as that of the subframe of the second resource.

Alternatively, the number of the subframe of the first resource is different from that of the subframe of the second resource;

the number of a subframe of the physical downlink shared channel (PDSCH) corresponding to the first downlink control information received on the first resource by the receiver is the same as that of the subframe of the first resource, and the number of a subframe of the PDSCH corresponding to the first downlink control information transmitted on the second resource is the same as that of the subframe of the second resource; or, the number of a subframe of the physical downlink shared channel (PDSCH) corresponding to the first downlink control information transmitted on the first resource is the same as that of the subframe of the first resource, and the number of a subframe of the PDSCH corresponding to the first downlink control information transmitted on the second resource is the same as that of the subframe of the physical downlink shared channel (PDSCH) corresponding to the first downlink control information transmitted on the first resource; or, the number of a subframe of the physical downlink shared channel (PDSCH) corresponding to the first downlink control information transmitted on the second resource is the same as that of the subframe of the second resource, and the number of a subframe of the PDSCH corresponding to the first downlink control information transmitted on the first resource is the same as that of the subframe of the physical downlink shared channel (PDSCH) corresponding to the first downlink control information transmitted on the second resource.

Alternatively, the number of the subframe of the first resource is the same as that of the subframe of the second resource;

the number of a subframe of the physical downlink shared channel (PDSCH) corresponding to the first downlink control information received by the receiver is the same as that of the subframe of the first resource, and the number of a subframe of the PDSCH corresponding to the first downlink control information transmitted on the second resource is the same as that of the subframe of the second resource.

Alternatively, the number of the subframe of the first resource is different from that of the subframe of the second resource;

the number of a subframe of the physical downlink shared channel (PDSCH) corresponding to the first downlink control information received by the receiver is the same as that of the subframe of the first resource, and the number of a subframe of the PDSCH corresponding to the first downlink control information transmitted on the second resource is the same as that of the subframe of the second resource; or, the number of a subframe of the physical downlink shared channel (PDSCH) corresponding to the first downlink control information transmitted on the first resource is the same as that of the subframe of the first resource, and the number of a subframe of the PDSCH corresponding to the first downlink control information transmitted on the second resource is the same as that of the subframe of the physical downlink shared channel (PDSCH) corresponding to the first downlink control information transmitted on the first resource; or, the number of a subframe of the physical downlink shared channel (PDSCH) corresponding to the first downlink control information transmitted on the second resource is the same as that of the subframe of the second resource, and the number of a subframe of the PDSCH corresponding to the first downlink control information transmitted on the first resource is the same as that of the subframe of the physical downlink shared channel (PDSCH) corresponding to the first downlink control information transmitted on the second resource.

Alternatively, when the number of a subframe of the first resource is different from the number of a subframe of the second resource, and the first downlink control information is used for scheduling the SIB1 transmitted by the serving node of the interfered cell on the physical downlink shared channel (PDSCH) of the interfered cell, the data on the PDSCH, obtained by the processor, further comprises first indicating information, wherein the first indicating information is used for indicating that the data on the PDSCH comprises the SIB1; or, the subframe number of a subframe of the PDSCH, obtained by the processor, is used for identifying that the data on the PDSCH corresponding to the first downlink control information comprises the SIB1.

Alternatively, when the number of a subframe of the first resource is different from the number of a subframe of the second resource, and the first downlink control information is used for scheduling the SIB1 transmitted by the serving node of the interfered cell on the physical downlink shared channel (PDSCH) of the interfered cell, the receiver is further configured to:

receive third downlink control information, wherein the third downlink control information comprises scheduling information for scheduling a system broadcast message except a master information block (MIB) and the SIB1, and the system broadcast message except the master information block (MIB) and the SIB1 is transmitted by the serving node of the interfered cell on the PDSCH of the interfered cell;

data transmitted on the PDSCH corresponding to the third downlink control information comprises second indicating information, wherein the second indicating information is used for indicating that the data transmitted on the PDSCH corresponding to the third downlink control information comprises the system broadcast message except the master information block (MIB) and the SIB1; or, the subframe number of the PDSCH corresponding to the third downlink control information is used for identifying that data transmitted on the PDSCH corresponding to the third downlink control information comprises the system broadcast message except the master information block (MIB) and the SIB1.

Alternatively, the serving node of the interfered cell is a low-power serving node; and the serving node of the interfering cell is a high-power serving node.

Alternatively, the extended physical resource obtained by extending a CSS of the PDCCH comprises:

an extended CCE with a numbers greater than or equal to 16 belonging to the CSS, obtained by extending the CSS consisting of control channel elements (CCEs) with numbers from 0 to 15.

In this embodiment, as the scheduling information of the interfered cell is transmitted on the first resource, the interference caused by the interfering cell can be reduced as much as possible, and the UE of the interfered cell can correctly demodulate the downlink control information.

The serving node shown in FIG. 13 or FIG. 15 may be an apparatus for specifically performing the functions of the serving node of the interfered UE, and functions of each module in FIG. 13 and FIG. 15 may be specifically referred to the corresponding descriptions of the serving node of the interfered UE in the above embodiments of the method. The user equipment shown in FIG. 14 or FIG. 16 may be an apparatus for specifically performing the functions of the interfered UE, and the functions of each module in FIG. 14 and FIG. 16 may be specifically referred to the corresponding descriptions of the interfered UE in the above embodiments of the method.

It should be understood for those skilled in the art that all or a part of the procedures in the above-mentioned embodiments of a method may be implemented with a computer program instructing corresponding hardware. The aforementioned programs may be stored in a computer-readable storage medium. When the program is executed, the procedures of the embodiments of the respective methods mentioned above may be include; and the aforementioned storage medium includes various kinds of medium that may store program codes, such as a ROM, a RAM, a magnetic disk, an optical disk, or the like.

In the end, it should be noted that the above embodiments are only used for illustrating the technical solution of the present invention, rather than limiting the present invention; although the present invention is illustrated in detail with reference to each aforementioned embodiment, it should be understood by those skilled in the art that modification may still be made on the technical solutions disclosed in each aforementioned embodiment, or equivalent alterations may be made to a part or all of the technical features thereof and such modification or alterations do not make the nature of corresponding technical solutions depart from the scope of the technical solution of each embodiment of the present invention.

What is claimed is:

1. A method for transmitting downlink control information, comprising:

determining, by a serving node of an interfered cell, a first resource, wherein the first resource is located in at least one of the following:

a physical resource comprised in a UE-specific search space (USS) of a physical downlink control channel (PDCCH), an extended physical resource obtained by extending a common search space (CSS) of the PDCCH, a physical resource comprised in a USS of an enhanced physical downlink control channel (E-PDCCH) and a physical resource comprised in a CSS of the E-PDCCH;

transmitting, by the serving node, first downlink control information of the interfered cell on the first resource, wherein the first downlink control information comprises scheduling information for scheduling a paging message and/or a system information block 1 (SIB1) transmitted by the serving node of the interfered cell, and the paging message and/or the SIB1 are/is transmitted by the serving node of the interfered cell on a physical downlink shared channel (PDSCH) of the interfered cell; and transmitting, by the serving node of the interfered cell, the first downlink control information on a second resource;

wherein the second resource is a resource used by a serving node of an interfering cell to transmit second downlink control information in the interfering cell, and the second downlink control information comprises scheduling information for scheduling a paging message and/or a SIB1 message transmitted by the serving node of the interfering cell on a physical downlink shared channel (PDSCH) of the interfering cell.

2. The method according to claim 1 wherein a number of a subframe of the first resource is the same as a number of a subframe of the second resource;

a number of a subframe of the physical downlink shared channel (PDSCH) indicated by the first downlink control information transmitted on the first resource is the same as that of the subframe of the first resource, and a number of a subframe of the PDSCH indicated by the first downlink control information transmitted on the second resource is the same as that of the subframe of the second resource.

3. The method according to claim 1 wherein, a number of a subframe of the first resource is different from a number of a subframe of the second resource; and wherein:

a number of a subframe of the physical downlink shared channel (PDSCH) indicated by the first downlink control information transmitted on the first resource is the same as that of the subframe of the first resource, and a number of a subframe of the PDSCH indicated by the first downlink control information transmitted on the second resource is the same as that of the subframe of the second resource; or the number of a subframe of the physical downlink shared channel (PDSCH) indicated by the first downlink control information transmitted on the first resource is the same as that of the subframe of the first resource, and the number of a subframe of the PDSCH indicated by the first downlink control information transmitted on the second resource is the same as that of the subframe of the physical downlink shared channel (PDSCH) indicated by the first downlink control information transmitted on the first resource; or the number of a subframe of the physical downlink shared channel (PDSCH) indicated by the first downlink control information transmitted on the second resource is the same as that of the subframe of the second resource, and the number of a subframe of the PDSCH indicated by the first downlink control information transmitted on the first resource is the same as that of the subframe of the physical downlink shared channel (PDSCH) indicated by the first downlink control information transmitted on the second resource.

4. The method according to claim 1 wherein, when a number of a subframe of the first resource is different from a number of a subframe of the second resource, and the first downlink control information is used for scheduling the SIB1 transmitted by the serving node of the interfered cell on the physical downlink shared channel (PDSCH) of the interfered cell, data transmitted on the PDSCH indicated by the first downlink control information comprises first indicating information, wherein the first indicating information indicates that the data transmitted on the PDSCH indicated by the first downlink control information comprises the SIB1; or the subframe number of a subframe of the PDSCH indicated by the first downlink control information identifies that data transmitted on the PDSCH indicated by the first downlink control information comprises the SIB1.

5. A method for receiving downlink control information, comprising:

receiving, by a user equipment (UE) of an interfered cell, first downlink control information transmitted by a serving node of the interfered cell on a first resource, wherein the first resource is located in at least one of the following: a physical resource comprised in a UE-specific search space (USS) of a physical downlink control channel (PDCCH), an extended physical resource obtained by extending a common search space (CSS) of the PDCCH, physical resource comprised in a USS of an enhanced physical downlink control channel (E-PDCCH), and a physical resource comprised in a CSS of the E-PDCCH; the first downlink control information comprises scheduling information for scheduling a paging message and/or a system information block 1 (SIB1) transmitted by the serving node of the interfered cell;

obtaining, by the UE, data on a physical downlink shared channel (PDSCH) indicated by the first downlink control information according to the first downlink control information, wherein the data on the PDSCH comprises the paging message and/or the SIB1; and receiving, by the UE, the first downlink control information transmitted by the serving node on a second resource, wherein the second resource is a resource used by a serving node of an interfering cell to transmit second downlink control information in the interfering cell, and the second downlink control information comprises scheduling information for scheduling a paging message and/or a SIB1 message transmitted by the serving node of the interfering cell on a physical downlink shared channel (PDSCH) of the interfering cell.

6. The method according to claim 5 wherein, a number of a subframe of the first resource is the same as a number of a subframe of the second resource;

a number of a subframe of the physical downlink shared channel (PDSCH) indicated by the first downlink control information transmitted on the first resource is the same as that of the subframe of the first resource, and a number of a subframe of the PDSCH indicated by the first downlink control information transmitted on the second resource is the same as that of the subframe of the second resource.

7. The method according to claim 5 wherein a number of a subframe of the first resource is different from a number of a subframe of the second resource;

and wherein:

a number of a subframe of the physical downlink shared channel (PDSCH) indicated by the first downlink control information transmitted on the first resource is the same as that of the subframe of the first resource, and a number of a subframe of the PDSCH indicated by the first downlink control information transmitted on the second resource is the same as that of the subframe of the second resource; or the number of a subframe of the physical downlink shared channel (PDSCH) indicated by the first downlink control information transmitted on the first resource is the same as that of the subframe of the first resource, and the number of a subframe of the PDSCH indicated by the first downlink control information transmitted on the second resource is the same as that of the subframe of the physical downlink shared channel (PDSCH) indicated by the first downlink control information transmitted on the first resource; or the number of a subframe of the physical downlink shared channel (PDSCH) indicated by the first downlink control information transmitted on the second resource is the same as that of the subframe of the second resource, and the number of a subframe of the PDSCH indicated by the first downlink control information transmitted on the first resource is the same as that of the subframe of the physical downlink shared channel (PDSCH) indicated by the first downlink control information transmitted on the second resource.

8. The method according to claim 5 wherein, when a number of a subframe of the first resource is different from a number of a subframe of the second resource, and the first downlink control information is used for scheduling the SIB1 transmitted by the serving node of the interfered cell on the physical downlink shared channel (PDSCH) of the interfered cell, the data on the PDSCH further comprises first indicating information, wherein the first indicating information indicates that the data on the PDSCH comprises the SIB1; or the subframe number of a subframe of the PDSCH identifies that the data on the PDSCH indicated by the first downlink control information comprises the SIB1.

9. A serving node, comprising:

a processor, configured to determine a first resource, wherein the first resource is located in at least one of the following:

a physical resource comprised in a UE-specific search space (USS) of a physical downlink control channel (PDCCH), an extended physical resource obtained by extending a common search space (CSS) of the PDCCH, physical resource comprised in a USS of an enhanced physical downlink control channel (E-PDCCH), and a physical resource comprised in a CSS of the E-PDCCH; and a transmitter, configured to transmit first downlink control information of an interfered cell on the first resource, wherein the first downlink control information comprises scheduling information for scheduling a paging message and/or a system information block 1 (SIB1) transmitted by the serving node of the interfered cell, and the paging message and/or the SIB1 are/is transmitted by the serving node of the interfered cell on a physical downlink shared channel (PDSCH) of the interfered cell;

wherein the transmitter is further configured to:

transmit the first downlink control information on a second resource; wherein the second resource is a resource used by a serving node of an interfering cell to transmit second downlink control information in the interfering cell and the second downlink control information comprises scheduling information for scheduling a paging message and/or a SIB1 message transmitted by the serving node of the interfering cell on a physical downlink shared channel (PDSCH) of the interfering cell.

10. The method according to claim 9, wherein
a number of a subframe of the first resource determined by the processor is the same as a number of a subframe of the second resource used by the transmitter;
a number of a subframe of the physical downlink shared channel (PDSCH) indicated by the first downlink control information transmitted on the first resource is the same as that of the subframe of the first resource, and a number of a subframe of the PDSCH indicated by the first downlink control information transmitted on the second resource is the same as that of the subframe of the second resource.

11. The method according to claim 9 wherein
a number of a subframe of the first resource determined by the processor is different from a number of a subframe of the second resource used by the transmitter; and wherein
a number of a subframe of the physical downlink shared channel (PDSCH) indicated by the first downlink control information transmitted on the first resource is the same as that of the subframe of the first resource, and a number of a subframe of the PDSCH indicated by the first downlink control information transmitted on the second resource is the same as that of the subframe of the second resource; or
the number of a subframe of the physical downlink shared channel (PDSCH) indicated by the first downlink control information transmitted on the first resource is the same as that of the subframe of the first resource, and the number of a subframe of the PDSCH indicated by the first downlink control information transmitted on the second resource is the same as that of the subframe of the physical downlink shared channel (PDSCH) indicated by the first downlink control information transmitted on the first resource; or
the number of a subframe of the physical downlink shared channel (PDSCH) indicated by the first downlink control information transmitted on the second resource is the same as that of the subframe of the second resource, and the number of a subframe of the PDSCH indicated by the first downlink control information transmitted on the first resource is the same as that of the subframe of the physical downlink shared channel (PDSCH) indicated by the first downlink control information transmitted on the second resource.

12. The method according to claim 9 wherein,
when a number of a subframe of the first resource is different from a number of a subframe of the second resource, and the first downlink control information is used for scheduling the SIB1 transmitted by the serving node of the interfered cell on the physical downlink shared channel (PDSCH) of the interfered cell, data transmitted on the PDSCH indicated by the first downlink control information transmitted by the transmitter comprises first indicating information, wherein the first indicating information indicates that the data transmitted on the PDSCH indicated by the first downlink control information comprises the SIB1; or
the subframe number of a subframe of the PDSCH indicated by the first downlink control information transmitted by the transmitter identifies that data transmitted on the PDSCH indicated by the first downlink control information comprises the SIB1.

13. A user equipment, comprising:
a receiver, configured to receive first downlink control information transmitted by a serving node of an interfered cell on a first resource, wherein the first resource is located in at least one of the following: a physical resource corresponding to a UE-specific search space (USS) of a physical downlink control channel (PDCCH), an extended physical resource obtained by extending a common search space (CSS) of the PDCCH, a physical resource corresponding to a USS of an enhanced physical downlink control channel (E-PDCCH), and a physical resource corresponding to a CSS of the E-PDCCH; the first downlink control information comprises scheduling information for scheduling a paging message and/or a system information block 1 (SIB1) transmitted by the serving node of the interfered cell; and
a processor, configured to obtain data on a physical downlink shared channel (PDSCH) indicated by the first downlink control information according to the first downlink control information received by the receiver, wherein the data on the PDSCH comprises the paging message and/or the SIB1;
wherein the receiver is further configured to:
receive the first downlink control information transmitted by the serving node on a second resource, wherein the second resource is a resource used by a serving node of an interfering cell to transmit second downlink control information in the interfering cell, and the second downlink control information comprises scheduling information for scheduling a paging message and/or a SIB1 message transmitted by the serving node of the interfering cell on a physical downlink shared channel (PDSCH) of the interfering cell.

14. The equipment according to claim 13 wherein
a number of a subframe of the first resource is the same as a number of a subframe of the second resource;
a number of a subframe of the physical downlink shared channel (PDSCH) indicated by the first downlink control information received by the receiver is the same as that of the subframe of the first resource, and a number of a subframe of the PDSCH indicated by the first downlink control information transmitted on the second resource is the same as that of the subframe of the second resource.

15. The equipment according to claim 13 wherein
a number of a subframe of the first resource is different from a number of a subframe of the second resource; and wherein
a number of a subframe of the physical downlink shared channel (PDSCH) indicated by the first downlink control information received by the receiver is the same as that of the subframe of the first resource, and a number of a subframe of the PDSCH indicated by the first downlink control information transmitted on the second resource is the same as that of the subframe of the second resource; or the number of a subframe of the physical downlink shared channel (PDSCH) indicated by the first downlink control information transmitted on the first resource is the same as that of the subframe of the first resource, and the number of a subframe of the PDSCH indicated by the first downlink control information transmitted on the second resource is the same as that of the subframe of the physical downlink shared channel (PDSCH) indicated by the first downlink control information transmitted on the first resource; or the number of a subframe of the physical downlink shared channel (PDSCH) indicated by the first downlink control information transmitted on the second resource is the same as that of the subframe of the second resource, and the number of the subframe of the PDSCH indicated by the first downlink control information transmitted on the first resource is the same as that of the subframe of the physical downlink shared channel (PDSCH) indicated by the first downlink control information transmitted on the second resource.

16. The equipment according to claim 13 wherein when a number of a subframe of the first resource is different from a number of a subframe of the second resource, and the first downlink control information is used for scheduling the SIB1 transmitted by the serving node of the interfered cell on the physical downlink shared channel (PDSCH) of the interfered cell, the data on the PDSCH, obtained by the processor, further comprises first indicating information, wherein the first indicating information indicates that the data on the PDSCH comprises the SIB1; or the subframe number of a subframe of the PDSCH, obtained by the processor, identifies that the data on the PDSCH indicated by the first downlink control information comprises the SIB1.

* * * * *